United States Patent
Pan et al.

(10) Patent No.: US 12,450,925 B2
(45) Date of Patent: Oct. 21, 2025

(54) METHOD FOR ACCURATE SEGMENTATION OF UNSTAINED LIVING ADHERENT CELLS IN DIFFERENTIAL INTERFERENCE CONTRAST IMAGES

(71) Applicants: City University of Hong Kong, Hong Kong (CN); HONG KONG CENTRE FOR CEREBRO-CARDIOVASCULAR HEALTH ENGINEERING LIMITED, Hong Kong (CN)

(72) Inventors: Fei Pan, Hong Kong (CN); Yutong Wu, Hong Kong (CN); Dong Sun, Hong Kong (CN); Hon-Fu Raymond Chan, Hong Kong (CN); Kangning Cui, Hong Kong (CN)

(73) Assignees: City University of Hong Kong, Hong Kong (CN); HONG KONG CENTRE FOR CEREBRO-CARDIOVASCULAR HEALTH ENGINEERING LIMITED, Hong Kong (CN)

( * ) Notice: Subject to any disclaimer, the term of this patent is extended or adjusted under 35 U.S.C. 154(b) by 264 days.

(21) Appl. No.: 18/500,218

(22) Filed: Nov. 2, 2023

(65) Prior Publication Data
US 2025/0148813 A1    May 8, 2025

(51) Int. Cl.
*G06K 9/00*        (2022.01)
*G06T 3/60*        (2006.01)
(Continued)

(52) U.S. Cl.
CPC .............. *G06V 20/695* (2022.01); *G06T 3/60* (2013.01); *G06T 7/12* (2017.01); *G06V 10/25* (2022.01);
(Continued)

(58) Field of Classification Search
None
See application file for complete search history.

(56) References Cited

PUBLICATIONS

Moen et al., "Deep learning for cellular image analysis", (Year: 2019).*

(Continued)

*Primary Examiner* — SJ Park
(74) *Attorney, Agent, or Firm* — S&F/WEHRW

(57) ABSTRACT

In cell instance segmentation of an original cell image obtained by microscopy, the original cell image is rotated by a rotation angle to yield a rotated cell image. A first machine-learning model for cell instance segmentation processes the original and rotated cell images such that effectively, horizontal and oblique boxes are used in bounding cells of the original cell image for enhancing cell-segmentation accuracy. A set of predictions is generated for each cell instance identified from the original and rotated cell images, yielding a plurality of sets of predictions for all cell instances. The plurality of sets of predictions is processed to remove any set having predicted space not simply connected, any unwanted set classified by a second machine-learning model as a poor indicator according to a certain performance criterion, and any redundant set. The plurality of sets of predictions then produces a segmentation map for the original cell image.

17 Claims, 13 Drawing Sheets
(10 of 13 Drawing Sheet(s) Filed in Color)

(51) Int. Cl.
  *G06T 7/12*       (2017.01)
  *G06V 10/25*      (2022.01)
  *G06V 10/44*      (2022.01)
  *G06V 10/771*     (2022.01)
  *G06V 20/69*      (2022.01)

(52) U.S. Cl.
  CPC ............ *G06V 10/44* (2022.01); *G06V 10/771* (2022.01); *G06V 20/698* (2022.01); *G06T 2207/10056* (2013.01)

(56) References Cited

PUBLICATIONS

F. Pan et al., "Dual-View Selective Instance Segmentation Network for Unstained Live Adherent Cells in Differential Interference Contrast Images," arXiv:2301.11499v1, Jan. 27, 2023.
K. He, G. Gkioxari, P. Dollár, and R. Girshick, "Mask R-CNN," in Proceedings of the IEEE International Conference on Computer Vision (ICCV), Venice, Italy, Oct. 2017, pp. 2980-2988. doi: 10/gfghjd.
Z. Huang, L. Huang, Y. Gong, C. Huang, and X. Wang, "Mask scoring R-CNN," in Proceedings of the IEEE/CVF Conference on Computer Vision and Pattern Recognition (CVPR), Jun. 2019, pp. 6409-6418. doi: 10/gg3d6j.
A. Kirillov, Y. Wu, K. He, and R. Girshick, "PointRend: Image segmentation as rendering," in Proceedings of the IEEE/CVF Conference on Computer Vision and Pattern Recognition (CVPR), Jun. 2020, pp. 9799-9808. doi: 10/ghbb7m.
Y. Fang et al., "Instances as queries," in Proceedings of the IEEE/CVF International Conference on Computer Vision (ICCV), Oct. 2021, pp. 6910-6919. doi: 10/gqggpx.
U. Schmidt, M. Weigert, C. Broaddus, and G. Myers, "Cell detection with star-convex polygons," in Medical Image Computing and Computer Assisted Intervention—MICCAI 2018, A. F. Frangi, J. A. Schnabel, C. Davatzikos, C. Alberola-López, and G. Fichtinger, Eds., in Lecture Notes in Computer Science. Cham: Springer International Publishing, 2018, pp. 265-273. doi: 10/ggnzqb.
J. Yi, P. Wu, M. Jiang, Q. Huang, D. J. Hoeppner, and D. N. Metaxas, "Attentive neural cell instance segmentation," Medical Image Analysis, vol. 55, pp. 228-240, Jul. 2019, doi: 10/gg73zt.
Yuxin Fang, Shusheng Yang, Xinggang Wang, Yu Li, Chen Fang, Ying Shan, Bin Feng and Wenyu Liu, "Instances as Queries" pp. 6910-6919.
Kaiming He, Georgia Gkioxari, Piotr Dolla'r and Ross Girshick "Facebook AI Research (FAIR)" arXiv:1703.06870v3 [cs.CV] Jan. 24, 2018 pp. 1-12.
Zhaojin Huang, Lichao Huang, Yongchao Gong, Chang Huang, Xinggang Wang "Mask Scoring R-CNN" pp. 6409-6418.
Alexander Kirillov, Yuxin Wu, Kaiming He and Ross Girshick "Facebook AI Research (FAIR)" PointRent: Image Segmentation as Rendering, pp. 9799-9808.
Uwe Schmidt, Martin Weigert, Coleman Broaddus and Gene Myers, "Cell Detection with Star-Convex Polygons" A.F. Frangi et al. (Eds.): MICCAI 2018, LNCS 11071, pp. 265-273, 2018.
Jingru Yi, Pengxiang Wu, Menglin Jiang, Qiaoying Huang, Daniel J. Hoeppner and Dimitris N. Metaxas "Attentive neural cell instance segmentation" Medical Image Analysis 55 (2019) 228-240.

\* cited by examiner

METHOD FOR ACCURATE SEGMENTATION OF UNSTAINED LIVING ADHERENT CELLS IN DIFFERENTIAL INTERFERENCE CONTRAST IMAGES

PRIOR DISCLOSURES BY THE INVENTOR OR A JOINT INVENTOR

Part of the present invention was disclosed in a paper published as "Dual-View Selective Instance Segmentation Network for Unstained Live Adherent Cells in Differential Interference Contrast Images," arXiv: 2301.11499v1 on Jan. 27, 2023. This paper is a grace period inventor-originated disclosure disclosed within one year before the effective filing date of this application. This paper is hereby incorporated by reference in its entirety.

ABBREVIATIONS

AM acetoxymethyl
AP average precision
AR average recall
BF bright field
CCD charge-coupled device
CMOS complementary metal oxide semiconductor
CNN convolutional neural network
DIC differential interference contrast
DMEM Dulbecco's modified eagle medium
DVS dual-view segmentation
DVSISN dual-view selective instance segmentation network
FBS fetal bovine serum
FCN fully convolutional network
GPU graphics processing unit
IoU intersection over union
JSON JavaScript Object Notation
MS mask selection
NMS non-maximum suppression
NSC neural stem cell
PASCAL pattern analysis, statistical modelling, and computational learning
PBS phosphate-buffered saline
PhC phase contrast
R-CNN region-based convolutional neural network
RGB red-green-blue
RoI region of interest
RPN region proposal network
SGD stochastic gradient descent
SOTA state-of-the-art
VOC visual object classes

TECHNICAL FIELD

The present invention relates to instance segmentation of cells in an image obtained by microscopy.

BACKGROUND

The cell, which is the fundamental unit of life, is a complex system of material metabolism, energy conversion, and information regulation. In a typical cell, whether bacterial or animal, water accounts for about 70% of its weight, making it transparent and colorless [1]. Consequently, image contrast is extremely weak when a cell is observed under a BF microscope. Alternative observation methods include PhC and DIC microscopy. In the former, a PhC microscope reveals many details about a cell's internal structures and discerns its attachments to nearby cells. In the latter, a DIC microscope provides pseudo-3D images with a shadow-cast appearance.

In addition to the two imaging modes, fluorescence microscopy is commonly used for observing specific macromolecules, such as proteins and nucleic acids in cells [2]. In a fluorescence microscope, a short-wavelength excitation light passing through an excitation filter irradiates fluorescent molecules (fluorophores) marked in the sample to generate visible light of a particular wavelength that can be seen by the viewer or digitally captured using a CMOS or CCD camera. However, fluorescence microscopy has several disadvantages, such as photobleaching and photo-toxicity. Consequently, label-free microscopy is still the most common noninvasive approach for observing living cells [3].

Concurrent with the progress in optics and advances in imaging, the demand for cell image processing in biomedical research has been increasing [4]. Typical tasks in cell image processing include image classification, cell detection/segmentation, cell tracking, and augmented microscopy [5]. Here, cell detection is a primary task aiming to locate each cell's position using a bounding box. By contrast, cell instance segmentation is a more demanding task that aims to detect each instance of different cells and generate its segmentation mask, even if they belong to the same class in an image [6].

Image segmentation refers to the partitioning of an image into multiple segments or components. Depending on the complexity of a task, image segmentation can be divided into three major categories [7]: (1) semantic segmentation, i.e. classifying pixels with semantic labels; (2) instance segmentation, i.e. identifying and segmenting individual objects; and (3) panoptic segmentation, i.e. combining semantic and instance segmentation tasks.

In recent years, instance segmentation has become a vital pursuit in computer vision, especially in fields like biomedical imaging. It aims to precisely identify and segment individual instances of various object categories within an image. Deep learning approaches for instance segmentation generally fall into two categories: one-stage and two-stage methods.

One-stage methods use CNN models directly for instance segmentation, omitting explicit feature localization. Conversely, two-stage methods, based on R-CNN, follow a two-step process: first, detecting bounding boxes containing objects, and then predicting foreground-background masks for each RoI, as exemplified by Mask R-CNN [8].

Mask R-CNN, a milestone in generic instance segmentation, extends Faster R-CNN [9] by integrating a mask branch for precise instance delineation. Like Faster R-CNN, it employs a RPN to identify RoIs in each input image. Subsequently, the model predicts the category and spatial layout of the contained object.

Mask Scoring R-CNN [10] addresses the discrepancy between classification and binary mask quality in Mask R-CNN by introducing a network block to compute the mask score. For scenarios involving dense or irregularly shaped objects, Rotated Mask R-CNN [11] employs a rotated bounding box representation, enhancing segmentation accuracy.

More recent advances in instance segmentation include PointRend [12], which refines mask predictions at various points within the mask rather than treating the entire mask uniformly. Additionally, QueryInst [13] introduces a query-based framework for instance segmentation tasks.

In recent developments, attention-based transformers (DETR) [14] have shown promise in object detection and universal image segmentation, suggesting potential progress in instance segmentation.

While prior reviews [3], [5], [15] have covered instance segmentation of adherent cells, recent algorithms warrant attention. StarDist [16], developed in 2018, was tailored for instance segmentation of stained nucleus images [17]. In 2019, ANCIS [18] was proposed to combine SSD [19] and U-Net [20] architectures with attention mechanisms for robust feature extraction in rat NSC DIC images.

In 2020, Cell-DETR [21], inspired by the attention-based transformer DETR, was introduced for detecting and segmenting cells in microstructures. However, it downsizes images prior to feature extraction, potentially impacting its ability to capture fine details.

For computational researchers, the problem of accurate instance segmentation of unstained living adherent cells in DIC images is primarily due to the lack of established datasets that contain at least hundreds of DIC images. Instead, most existing datasets are built upon PhC or fluorescence images [15]. For experimental researchers, the problem is primarily due to the lack of out-of-the-box instance segmentation algorithms designed for unstained living adherent cells in DIC images. In particular, the difficulty of instance segmentation for unstained living adherent cells lies in four aspects. First, adherent cells have a variety of states and can be roughly divided into healthy and unhealthy cells. Second, adherent cells have irregular morphology and random orientations. Third, boundaries of scattered adherent cells fade into the image background. Fourth, adherent cells tend to aggregate and cause their boundaries more challenging to distinguish. Altogether, these features pose a prohibitive barrier to accurately segmenting individual adherent cells.

As such, there is a need in the art for an instance segmentation algorithm with improved accuracy in cell instance segmentation, and especially in segmenting unstained adherent cells.

SUMMARY

A first aspect of the present invention is to provide a first computer-implemented method of cell instance segmentation of an original cell image obtained by microscopy.

The first method comprises: rotating the original cell image by a rotation angle to yield a rotated cell image; using a first machine-learning model configured for cell instance segmentation to process the original and rotated cell images such that effectively, horizontal boxes and oblique boxes are used in bounding cells of the original cell image for enhancing cell-segmentation accuracy in segmenting the original cell image, wherein the first machine-learning model generates a set of predictions for an individual cell instance in a plurality of cell instances identified from the original and rotated cell images such that a first plurality of sets of predictions is obtained for the plurality of cell instances, and wherein the set of predictions includes a bounding box for bounding the individual cell instance, and a foreground-background binary mask for predicting a space occupied by the individual cell instance; removing, from the first plurality of sets of predictions, any set of predictions having the predicted space not simply connected to thereby form a second plurality of sets of predictions; using a second machine-learning model to classify an individual set of predictions in the second plurality of sets of predictions as a wanted set of predictions or an unwanted set of predictions according to a prediction performance of the individual set of predictions; removing, from the second plurality of sets of predictions, any unwanted set of predictions as classified to thereby form a third plurality of sets of predictions; removing, from the third plurality of sets of predictions, any redundant set of predictions to form a fourth plurality of sets of predictions, wherein an individual redundant set of predictions as generated for a cell instance located or equivalently located at a location on the original cell image has another set of predictions generated for the same location in the third plurality of sets of predictions; and using the fourth plurality of sets of predictions to produce a segmentation map for the original cell image.

In certain embodiments, the rotation angle is 45°.

In certain embodiments, the set of predictions further includes one or more class labels for classifying the individual cell instance.

In certain embodiments, the first machine-learning model for processing an input image comprises: a backbone for extracting features of the input image to generate feature maps; a RPN for generating region proposals from the feature maps; a RoIAlign module for aligning the input image and the feature maps; a plurality of FC layers for bounding-box generation and class-label generation from the feature maps; and a plurality of convolution layers for foreground-background binary mask generated from the feature maps.

In certain embodiments, the backbone is implemented as ResNet-50 or ResNet-101.

In certain embodiments, the second machine-learning model is a ResNet classifier.

In certain embodiments, the cells of the original cell image are adherent cells.

In certain embodiments, the cells of the original cell image are unstained.

In certain embodiments, the cells of the original cell image are living cells.

In certain embodiments, the original cell image is a DIC image.

A second aspect of the present invention is to provide a second computer-implemented method for segmenting cells in plural original cell images obtained by microscopy.

The method comprises the steps of: (a) rotating the original cell images to obtain rotated cell images; (b) training a deep-learning-based instance segmentation algorithm on a cell image dataset comprising the original cell images and rotated cell images; (c) using the trained deep-learning-based instance segmentation algorithm to process the original cell images and rotated cell images to obtain predictions, wherein the predictions include predicted bounding boxes, classification labels, and foreground-background binary masks; (d) concatenating the predictions for every pair of an individual original cell image and a corresponding rotated cell image throughout the entire dataset; (e) filtering the concatenated predictions as identified in the step (d); (f) saving the filtered predictions offline; (g) compacting the saved offline predictions by removing respective saved offline predictions having corresponding foreground-background binary masks not simply connected; (h) formulating masked images for the saved offline predictions identified in the step (g), wherein an individual masked image is obtained by overlaying a background part of corresponding predicted binary mask on a corresponding original image; (i) training a deep-learning-based binary classification algorithm with the masked images obtained in the step (h) to generate unwanted and wanted masks; and (j) processing the wanted masks obtained in the step (i) to produce final segmentation.

In certain embodiments, the cells are adherent cells.

In certain embodiments, the cells are unstained.

In certain embodiments, the cells are living cells.

In certain embodiments, the original cell images are DIC images.

Other aspects of the present disclosure are disclosed as illustrated by the embodiments hereinafter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Skilled artisans will appreciate that elements in the figures are illustrated for simplicity and clarity and have not necessarily been depicted to scale.

DETAILED DESCRIPTION

The present invention is concerned with segmenting cells in original cell images. Deep-learning-based models are used in the present invention. A main advantage of using the present invention is that it offers accurate segmentation of cells. The present invention is particularly useful for cell instance segmentation of unstained living adherent cells in DIC images, although the present invention is not limited to cell instance segmentation under the aforementioned conditions.

The present invention is developed based on the following observations made by the Inventors. Since adherent cells are elongated, often tightly closed to one another, and frequently at oblique angles. A natural doubt is that merely a horizontal bounding box cannot capture a sloping cell without including its adjacent cells, thus making predicting masks harder. For example, Mask R-CNN predicts binary masks for each RoI using a FCN that is sufficient for segmenting scattered objects. However, a preliminary experiment reveals that Mask R-CNN produces duplicate predictions of RoIs and causes the predicted masks of cell edges to be vague. Consequently, an intuitive question is whether or not we apply a rotation operation of 45° on an input image before data augmentation. The Inventors have found that, and as evidenced below, the introduction of the rotation operation increases accuracy in cell instance segmentation.

Figure 1:
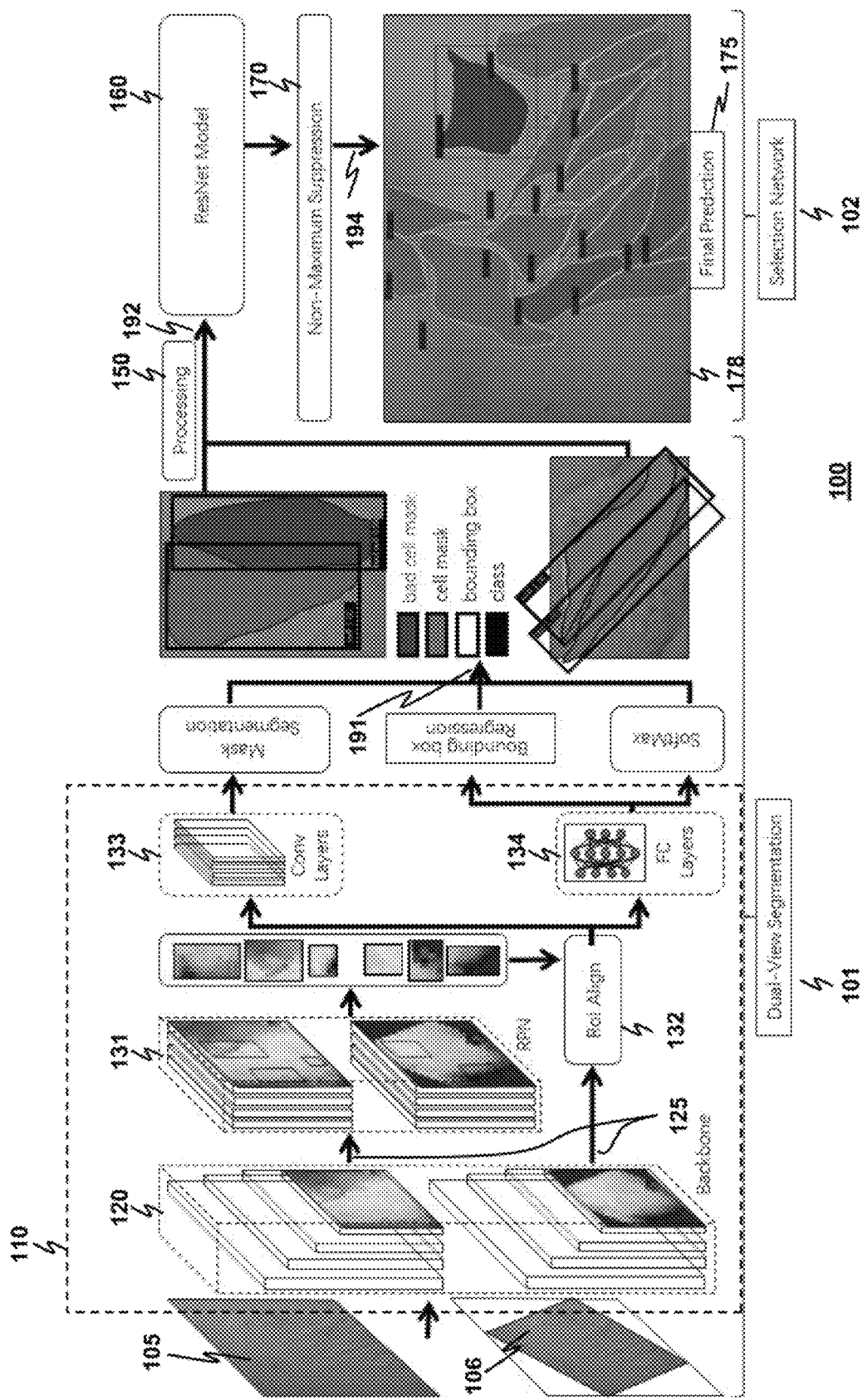
FIG. 1 depicts a schematic diagram of a machine-learning framework that employs deep-learning-based models for realizing computer-implemented methods as disclosed herein for cell instance segmentation, where the framework is named as DVSISN, which has a DVS part and a MS part.
Figure 2:
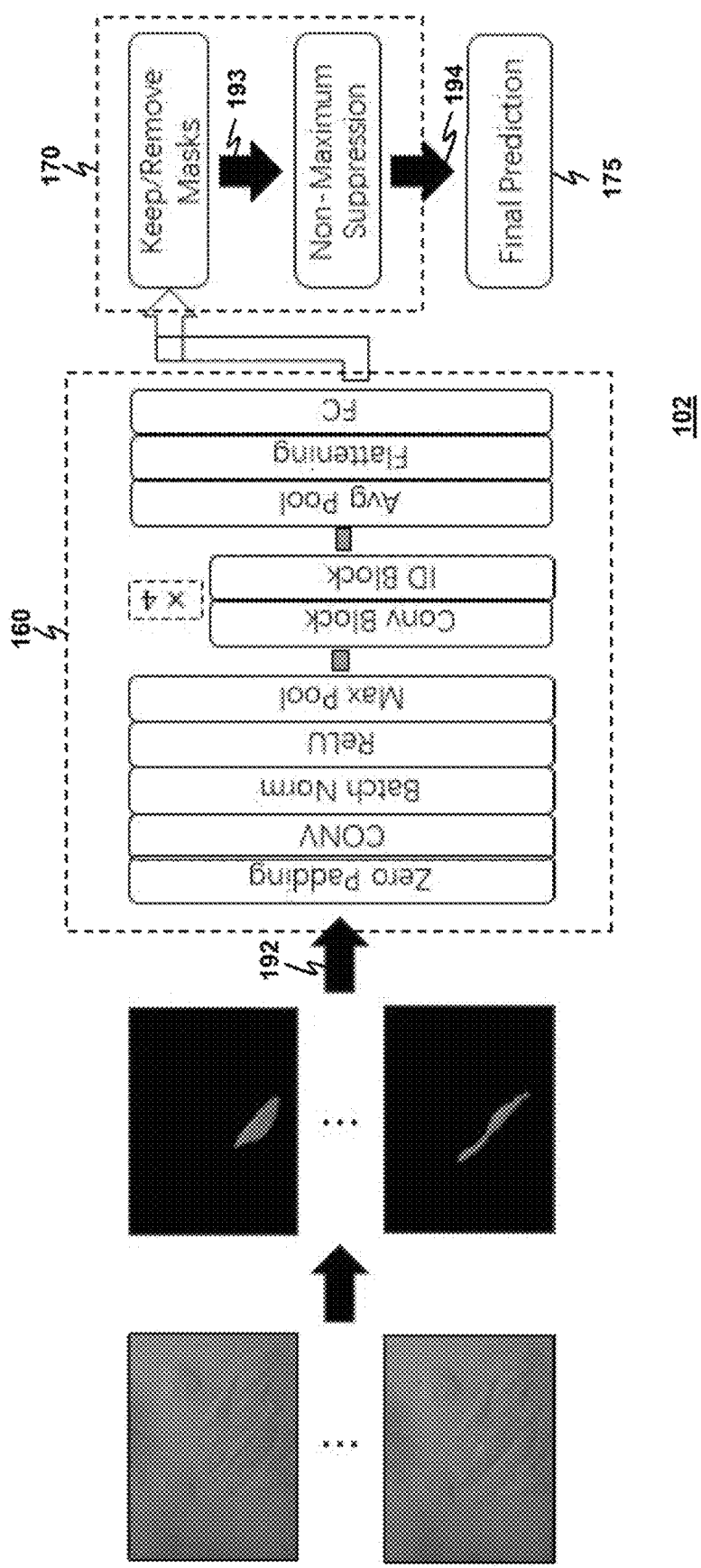
FIG. 2 depicts a schematic diagram illustrating one embodiment of the MS part.

In the present invention, a machine-learning framework using deep-learning-based models is developed for cell instance segmentation. FIG. 1 depicts a schematic diagram of the machine-learning framework. The framework, named as DVSISN 100, has two parts, which are a DVS part 101 and a MS part 102. FIG. 2 depicts a schematic diagram illustrating one embodiment of the MS part 102.

In the DVSISN 100, the DVS part 101 is used for producing binary segmentation masks with class labels. The DVS part 101 takes an original cell image 105 and a rotated cell image 106 as inputs and generates unfiltered bounding boxes and masks of identified cells as outputs. The MS part 102 is used for removing redundant cell instances and keeping the finest ones, i.e. the ones with highest accuracy in segmentation.

The DVS part 101 extends the structure of Mask R-CNN. First, we augment each input image by rotating it by 45° and then pass the two views of the image to a backbone 120 for feature extraction to yield feature maps 125. A technique, RPN [9], is then applied to generate region proposals from the extracted feature maps 125. Another technique, RoIAlign [8], is used to align the input image and the feature maps properly. Second, the bounding box classification & regression, and mask segmentation are performed in parallel to predict the class, location, and profile of each object contained in bounding boxes. Third, masks containing more than one component are deleted, since cells are simply connected.

The DVS part 101 generates probability distributions $p=(p_0, \ldots, p_K)$ over K+1 classes ($p_0$ for background), bounding box regression offsets $t^k \in R^4$ for k=1, ..., K, and a binary mask $\hat{y} \in R^{M \times N}$ of the ground truth class $k_{gt}$ for each RoI. Each RoI is labeled with a class $k_{gt}$, a bounding box offsets vector $v \in R^4$, and a binary mask $y \in R^{M \times N}$ in training using the multi-task loss as in the Mask R-CNN:

$$L = L_b + L_c + L_m, \qquad (1)$$

where: L is the multi-task loss; $L_b(k, t^k, v)=1[k \geq 1]\Sigma_{i=1}^{4} d(t_i^k - v_i)$ accounts for the bounding box regression loss with $$d(x) = \begin{cases} 0.5x^2, & |x| \leq 1, \\ |x| - 0.5, & \text{otherwise;} \end{cases} \qquad (2)$$

$L_c(p, k)=-\log p_k$ accounts for the classification loss of predictions of cell types; and $L_m$ is the average binary cross-entropy loss only defined for $k_{gt}$ of each RoI, and is given by $$L_m(y, \hat{y}) = -\frac{\sum_{i=1}^{M} \sum_{j=1}^{N} y_{i,j} \log s(\hat{y}_{i,j}) + (1 - y_{i,j}) \log (1 - s(\hat{y}_{i,j}))}{MN}. \qquad (3)$$

The MS part 102 comprises a ResNet classifier 160 [22] and a post-processing module 170. The MS part 102 is responsible for removing unwanted bounding boxes generated by the DVS part 101, since feeding a pair of original and rotated images into the DVS part 101 almost doubles the number of predicted bounding boxes, as each cell is often searched twice so that it leads to repeated detection of cells. Additionally, since the unsupervised NMS technique [23] can efficiently remove duplicates only when cells are scattered, the selection criteria of this technique is relaxed by increasing the IoU threshold of NMS in DVS and add a supervised selection step, namely MS, to keep the predicated masks closest to the ground truth.

A cell mask m produced by the DVS part 101 is assigned with a label $y_m=1$ if it has the maximum IoU with the ground truth. Otherwise, the cell mask is assigned with a label $y_m=0$. Then constructed cell masks and their binary labels are used to train the ResNet classifier 160 equipped with a cross-entropy loss to select appropriate masks. Finally, masks having the largest IoU (and over 0.7) with other masks at "each spot" are preserved to prevent redundancies. As such, the MS part 102 is designed as a supervised selection step to keep the best mask predictions only.

Exemplarily, an approach of generating the ground truth is elaborated as follows by describing generation of ground truth for the current study that led to the development of the present invention.

The current study used HepG2 human liver cancer cells to provide cell images. Cells were cultured in DMEM (Gibco) supplemented with 10% FBS (Gibco), 100 U/mL of penicillin, and 100 U/mL of streptomycin in a 35 mm glass-bottom Petri dish (culture dish 801002. Wuxi NEST Biotechnology) and placed in a humidified atmosphere of 37° C. and 5% $CO_2$. Calcein AM, a commonly used fluorescent dye, was used to test cell viability and for short-term staining. Before image collection, 5 μL of 4 mmol calcein AM (L6037S, US Everbright, Inc.) was taken from the refrigerator and restored to room temperature. Then, it was mixed with 10 mL of PBS to stain the cultured cells. Calcein AM emits 530 nm fluorescence when excited by a 488 nm laser; thus, living cells stained with calcein AM appear green.

After cell staining, the dish was transferred from the incubator to an inverted fluorescence microscope (Eclipse Ts2R-FL, Nikon). The microscope was equipped with a motorized XY stage (ProScan H117P1N4, Prior Scientific) and a CMOS camera (DigiRetina 16. Tucsen Photonics). A homemade control software [24] first drove the motorized stage to move the dish (and cultured cells) to predefined locations to capture DIC images and then drove the stage again to move the dish to the same locations to capture fluorescence images. In this manner, 520 pairs of DIC and fluorescence images were captured under a 40× objective lens (CFI S Plan Fluor ELWD 40XC 228 MRH08430, Nikon). All images were RGB color images and resized to 1152 pixels×864 pixels, representing approximately 216.500 μm×162.375 μm in the dish.

Figure 6:
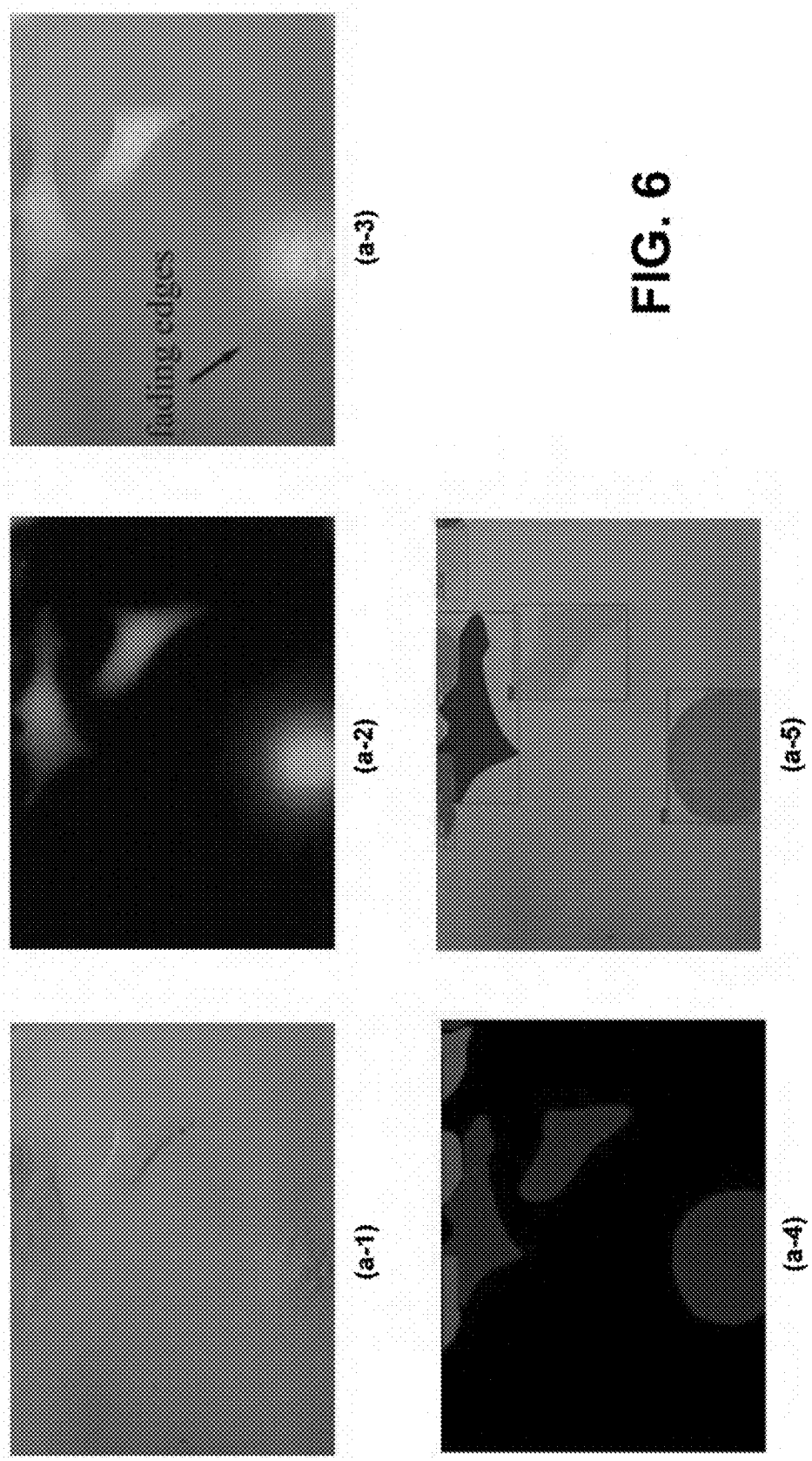
FIG. 6 provides an overview of a cell image dataset as used by the DVSISN in obtaining experimental results.
Figure 6:
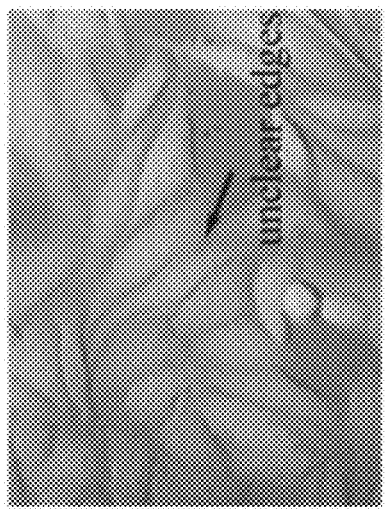
Figure 6:
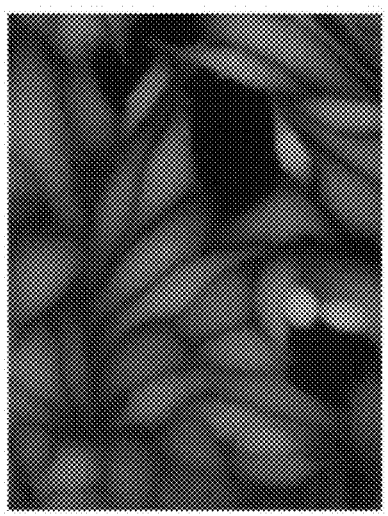
Figure 6:
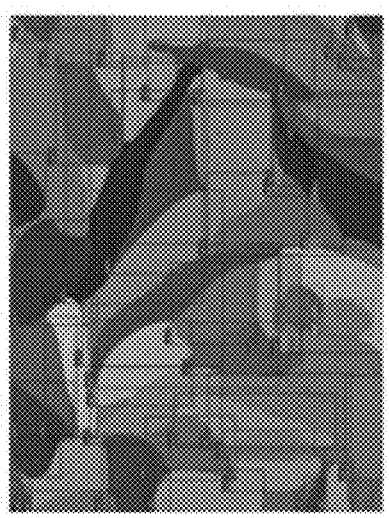
Figure 6:
Figure 6:
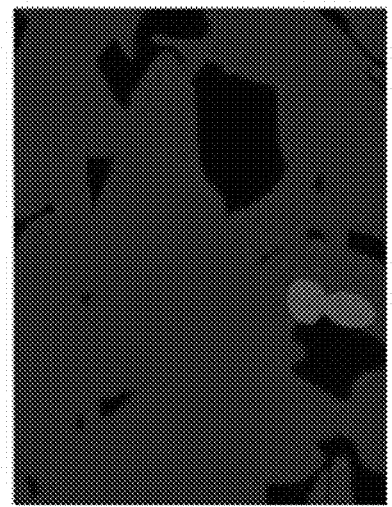
Figure 6:
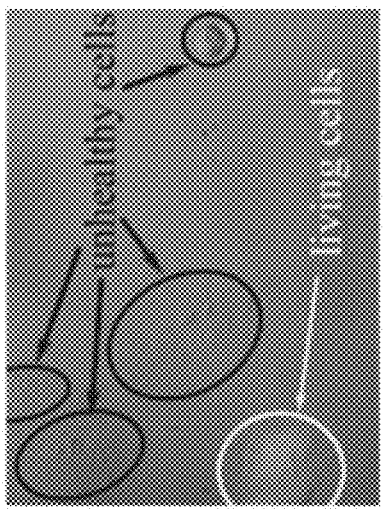
Figure 6:
Figure 6:
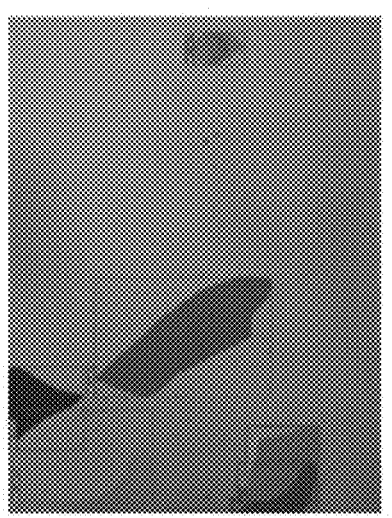
Figure 6:
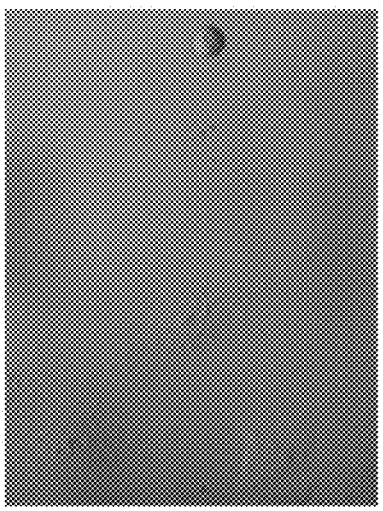
Figure 6:
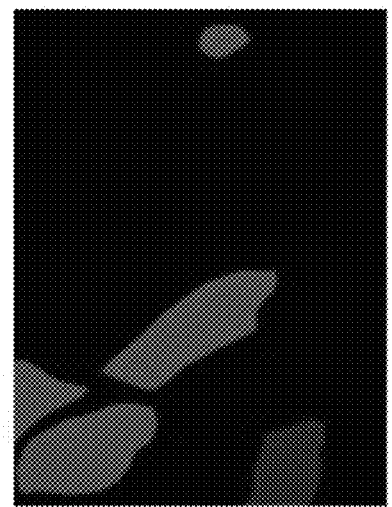

Each pair of DIC images [Subplots (a-1), (b-1) and (c-1) in FIG. 6] and its fluorescence counterpart [Subplots (a-2), (b-2) and (c-2) in FIG. 6] is merged for manual annotation [Subplots (a-3), (b-3) and (c-3) in FIG. 6]. We generated our ground truth by collaborating with a specialized annotation company online. The company used the LabelMe software [25] to annotate the merged fluorescence and DIC images and saved the results in a single JSON file.

A first aspect of the present invention is to provide a computer-implemented method of cell instance segmentation of an original cell image 105 obtained by microscopy.

Figure 3:
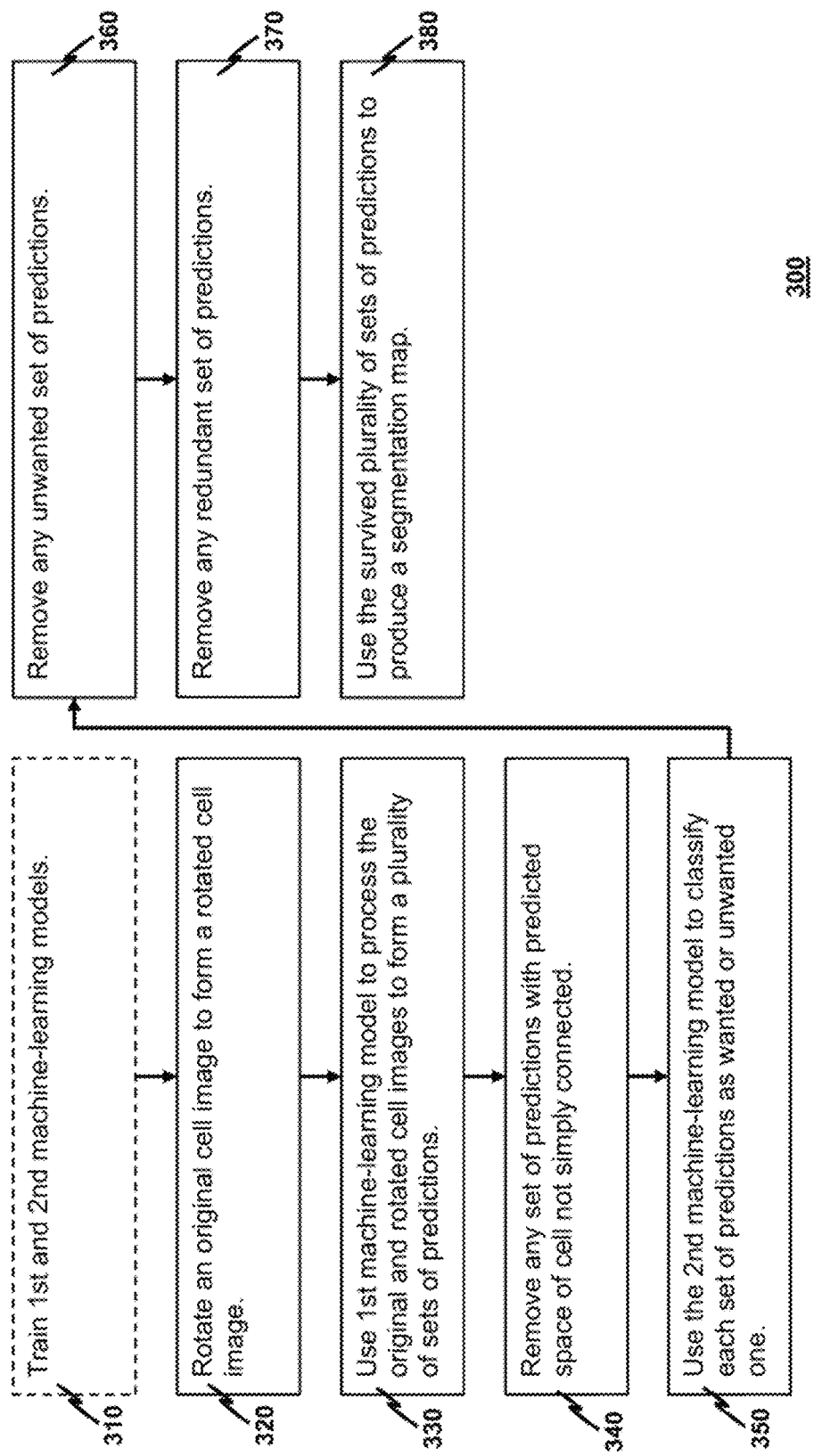
FIG. 3 depicts a workflow showing exemplary steps used in a first disclosed method.

Based on the details of the DVSISN 100 as disclosed above, an exemplary processing flow of the disclosed method is elaborated as follows with the aid of FIG. 3. FIG. 3 depicts an exemplary workflow 300 of the disclosed method.

To facilitate illustration of the workflow 300, it is considered that a first machine-learning model 110 is used in the DVS part 101 and a second machine-learning model 160 is used in the MS part 102. The first and second machine-learning models 110, 160 are generic machine-learning models. The first machine-learning model 110 is configured for cell instance segmentation while the second machine-learning model 160 is configured for classification.

In step 320, the original cell image 105 is rotated by a rotation angle to yield a rotated cell image 106. It is preferable that the rotation angle is 45°, although other values may also be used. Using the rotation angle of 45° implies that horizontal boxes and oblique boxes inclined by 45° are (directly and indirectly) used in bounding cells of the original cell image 105.

After the rotated cell image 106 is obtained, the first machine-learning model 110 is employed to process the original and rotated cell images 105, 106 for cell instance segmentation in step 330. Note that the first machine-learning model 110 is configured to bound cells in an input image by using horizontal bounding boxes only. Despite this, processing both the original and rotated cell images 105, 106 by the first machine-learning model 110 effectively causes horizontal boxes and oblique boxes to be used in bounding the cells of the original cell image 105 for enhancing cell-segmentation accuracy in segmenting the original cell image 105. In particular, the first machine-learning model 110 generates a set of predictions for an individual cell instance in a plurality of cell instances identified from the original and rotated cell images 105, 106. As a result, a first plurality of sets of predictions 191 is obtained for the plurality of cell instances from the first machine-learning model 110. The set of predictions for the individual cell instance includes a bounding box for bounding the individual cell instance, and a foreground-background binary mask for predicting a space (namely, a two-dimensional region on an image) occupied by the individual cell instance. Classification of the individual cell instance is often required in certain practical situations. It follows that generally, the set of predictions further includes one or more class labels for classifying the individual cell instance.

As shown in FIG. 1, a preferable implementation of the first machine-learning model 110 for processing an input image (which is either the original cell image 105 or the rotated cell image 106) comprises a backbone 120, a RPN 131, a RoIAlign module 132, a plurality of convolution layers 133 and a plurality of FC layers 134. The backbone 120 is used for extracting features of the input image to generate feature maps 125. Examples of the backbone 120 include ResNet-50 and ResNet-101. The RPN 131, as detailed in, e.g., [9], is used for generating region proposals from the feature maps 125. The RoIAlign module 132, which implements an RoIAlign algorithm detailed in, e.g., [8], is used for aligning the input image and the feature maps 125. The plurality of FC layers 134 is used for bounding-box generation and class-label generation from the feature maps 125. The plurality of convolution layers 133 is used for foreground-background binary mask generation from the feature maps 125.

If the foreground-background binary mask predicts that the space occupied by the a certain cell instance is not a single piece and is composed of plural distinct regions (so that the space is not simply connected), this cell instance is not a valid cell and should be discarded from the first plurality of sets of predictions 191. In step 340, any set of predictions having the predicted space not simply connected is removed from the first plurality of sets of predictions 191. As a result, a second plurality of sets of predictions 192 is formed. Note that the step 340 is implemented as a module 150 in FIG. 1.

In step 350, the second machine-learning model 160 is used to classify an individual set of predictions in the second plurality of sets of predictions 192 as a wanted set of predictions or an unwanted one according to a prediction performance of the individual set of predictions. That is, if the individual set of predictions provides a poor indicator to a certain aspect of interest according to a certain performance criterion, the individual set of predictions is classified as an unwanted set of predictions and is not to be used in final prediction/generation 175 of cell instance segmentation. In step 360, any unwanted set of predictions as classified in the step 350 is removed from the second plurality of sets of predictions 192, thereby forming a third plurality of sets of predictions 193.

As mentioned above, a ResNet classifier equipped with a cross-entropy loss to select appropriate masks may be used as the second machine-learning model 160. Details of the ResNet classifier may be found in, e.g., [22].

After the third plurality of sets of predictions 193 is obtained, duplicated sets of predictions therein are required to be removed as mentioned above. In step 370, any redundant set of predictions is removed from the third plurality of sets of predictions 193 to thereby form a fourth plurality of sets of predictions 194. A redundant set of predictions is defined as follows. A redundant set of predictions generated for a cell instance located, or equivalently located, at a location on the original cell image 105 has another set of predictions generated for the same location in the third plurality of sets of predictions 193. The notion of "a cell instance equivalently located at a location on the original cell image 105" is applicable when the cell instance appears on the rotated cell image 106. The location of the cell instance on the rotated cell image 106 has a corresponding location (i.e. an equivalent location) on the original cell image 105.

Note that the steps 360 and 370 are collectively implemented as the post-processing module 170 in FIGS. 1 and 2.

The final prediction/generation 175 of cell instance segmentation is carried out based on the fourth plurality of sets of predictions 194. In step 380, the fourth plurality of sets of predictions 194 is used to produce a segmentation map 178 for the original cell image 105.

Note that the first and second machine-learning models 110, 160 can be used in the steps 330 and 350, respectively, after the two models 110, 160 are trained. The workflow 300 may further include step 310, an initialization step of training the first and second machine-learning models 110, 160, before executing the step 330.

The workflow 300 is focused on segmenting the original cell image 105 after the first and second machine-learning models 110, 160 are trained. In further embodiments of the present invention, plural original cell images are segmented and the associated workflow is adjusted such that the plural original cell images are also advantageously involved in tuning the first and second machine-learning models 110, 160 before the cell instance segmentation is done.

A second aspect of the present invention is to provide a computer-implemented method for segmenting cells in plural original cell images obtained by microscopy.

Figure 4:
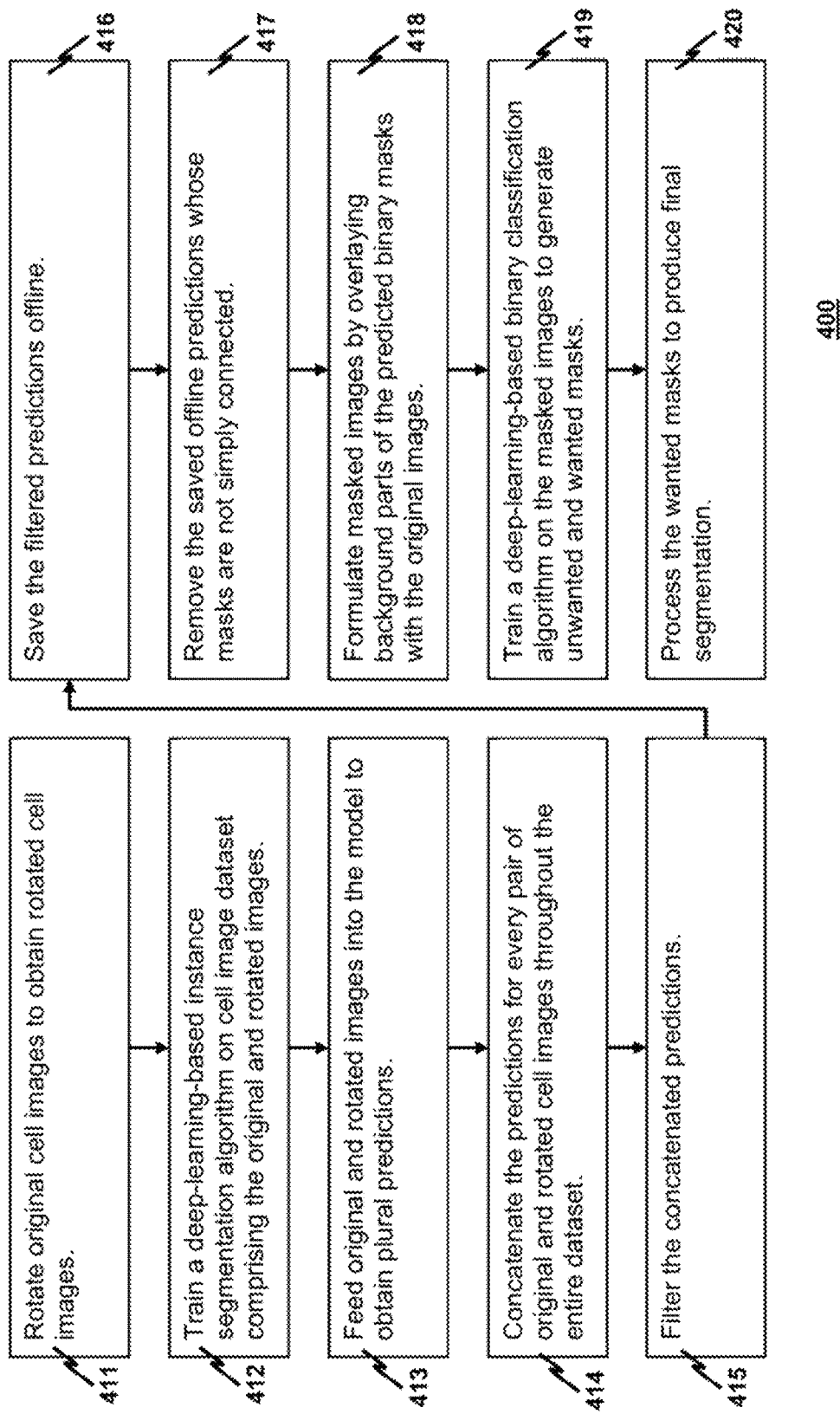
FIG. 4 depicts a workflow showing exemplary steps used in a second disclosed method.

The disclosed method is illustrated as follows with the aid of FIG. 4, which depicts an exemplary workflow 400 of the disclosed method. Since the workflow 400 is similar in detail to the workflow 300, identical or similar details are not repeated in describing the workflow 400 for simplicity.

In the workflow 400, first, all original cell images are rotated to obtain rotated cell images (step 411).

Second, a deep-learning-based instance segmentation model (i.e. the first machine-learning model 110) is trained on a cell image dataset comprising the original and rotated cell images (step 412).

Third, the original cell images and rotated cell images are fed into the trained instance segmentation algorithm to obtain a series of predictions, including predicted bounding boxes, classification labels, and foreground-background binary masks (step 413).

Fourth, the predictions for every pair of an individual original cell image and a corresponding rotated cell image are concatenated throughout said entire dataset (step 414).

Fifth, the predictions obtained in the step 414 are filtered (step 415).

Sixth, the filtered predictions are saved offline (step 416).

Seventh, the saved offline predictions whose masks are not simply connected are removed, thereby compacting the saved offline predictions (step 417).

Eighth, masked images for the saved offline predictions identified in the step 417 (which are valid predictions) are formulated. In particular, an individual masked image is obtained by overlaying a background part of corresponding predicted binary masks on a corresponding original image (step 418).

Ninth, a deep-learning-based binary classification algorithm (i.e. the second machine-learning model 160) is trained on the masked images obtained in the step 418 to generate unwanted and wanted masks (step 419).

Tenth, the wanted masks in the step 419 are processed to produce final segmentation (step 420).

The two disclosed methods according to the workflows 300, 400 may be implemented by one or more computing devices. An individual computing device may be a general-purpose processor, a special-purpose processor, a graphics processing unit, a computer, a standalone computing server, a distributed server in a computing cloud, a mobile computing device, etc. Each of the two disclosed methods may be stored in a non-transitory computer readable storage medium in the form of program instructions which, when executed by a computing processor, cause the computing processor to execute a process of segmenting cells in one or more original cell images according to any embodiment of the two disclosed methods.

For demonstration purposes, experimental results of using the disclosed DVSISN 100 with the workflow 400 for cell instance segmentation were obtained, and are presented as follows.

We implemented the DVSISN 100 based on the MMDetection toolbox with the PyTorch framework [25]. The DVSISN 100 was trained in two stages. First, the backbone networks of the DVS part 101 were pre-trained on the COCO dataset [26] and tuned on our dataset. Second, The MS part 102 was pre-trained on the ImageNet dataset [27], fine-tuned on the cell masks produced by the DVS part 101, and constructed binary labels $y_m$.

Data augmentation techniques, such as flipping, padding, and resizing, were used to increase training samples in the DVS part 101. We assigned each GPU with two input images and used the RPN to generate RoIs. An RoI is regarded as positive if its IoU with a ground truth is over 0.7. Moreover, the RPN anchors are constructed by 5 aspect ratios (0.3, 0.5, 1, 2, 3) with a fixed scale 8, representing the length of an anchor's shortest side. ResNet-34 is used as the backbone of the MS part 102 with a batch size of 32. We used SGD with an initial learning rate of 0.05, a weight decay of 0.0001, a momentum of 0.9, and 500 iterations of warm-up.

Figure 5:
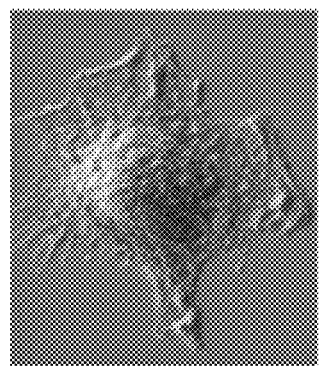
FIG. 5 depicts a typical spreading process of an adherent cell in four steps on a glass coverslip, where the cell was photographed after (a) 30 minutes, (b) 60 minutes, (c) 2 hours and (d) 24 hours of attachment on the glass coverslip.
Figure 5:
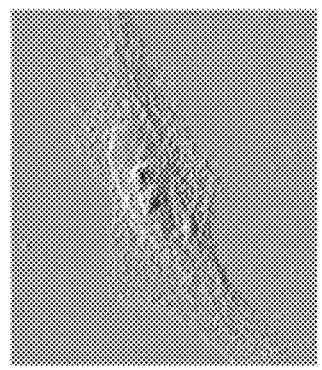
Figure 5:
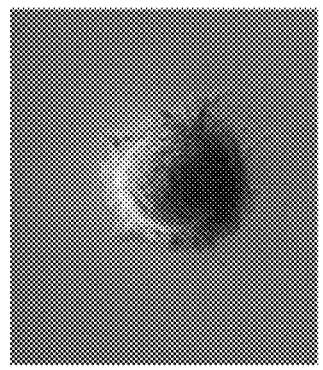
Figure 5:
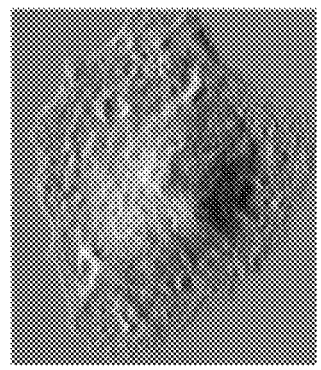

Before presenting the experimental results, we provide an overview on the spreading process of an adherent cell. FIG. 5 depicts a typical adherent-cell spreading process in 4 steps on a glass coverslip. The cell was fixed and photographed after (a) 30 minutes, (b) 60 minutes, (c) 2 hours and (d) 24 hours of attachment on the glass coverslip.

FIG. 6 provides an overview of a cell image dataset for use in the disclosed DVSISN 100. In the cell image dataset, HepG2 human liver cancer cells were used to provide cell images.

Most cells derived from vertebrates, such as birds and mammals, except for hematopoietic cells, germ cells, and a few others, are adherent cells. As opposed to suspension cells, adherent cells are anchorage-dependent and must be cultured on a tissue culture-treated substrate to allow cell adhesion and spreading. From the perspective of morphology, adherent cells can be classified into fibroblast-like and epithelial-like cells. The former is bipolar or multipolar and typically has elongated shapes, while the latter is polygonal and grows as discrete patches. Both cell types have a highly irregular morphology compared with the spherical shape of suspensions cells, bringing considerable difficulties for an algorithm to detect, segment, track, and analyze adherent cells.

Moreover, adherent cells are transparent; thus, they can hardly be observed under a light microscope unless stained. Conventionally, researchers use DIC microscopes because they can observe delicate structures in unstained specimens and render 3D images with a sense of relief. The working principle is that a DIC microscope converts the phase difference of an object into amplitude changes through the interference of coherent light beams between which the distance is relatively small, i.e. only 1 μm or less, inside and outside the sample.

Adherent cells can be roughly classified into two types from the perspective of cell health: healthy (living) and unhealthy (dead or loosely attached) cells. Healthy adherent cells typically adhere to the culture surface, have an irregular morphology, and appear entirely green in the fluorescence images once stained by calcein AM. In comparison, some unhealthy cells, e.g., dead cells, can hardly be stained by calcein AM and only appear slightly green. Other unhealthy cells can be successfully stained by calcein AM but loosely adhere to the culture surface and are not ideal candidates for typical biomedical experiments, such as cell microinjection. In addition to classifying cells by how healthy they are, they can be classified by how densely they grow. Sparsely distributed cells are relatively easy to recognize, but densely distributed cells are difficult to distinguish from one another, even by humans. Therefore, people can distinguish individual cells clearly only through cell staining.

HepG2 cells were cultured in the DMEM (Gibco) supplemented with 10% FBS (Gibco), 100 U/mL of penicillin, and 100 U/mL of streptomycin in a 35 mm glass-bottom Petri dish (culture dish 801002, Wuxi NEST Biotechnology) and placed in a humidified atmosphere of 37° C. and 5% $CO_2$. Calcein AM, a commonly used fluorescent dye, was used to test cell viability and for short-term staining. Before image collection, 5 μL 4 mmol calcein AM (L6037S, US Everbright Inc.) was taken from the refrigerator and restored at room temperature. Then it was mixed with 10 mL PBS to stain the cultured cells. Because the calcein AM emits 530 nm fluorescence when excited by a 488 nm laser, live cells stained with the calcein AM look green.

After cell staining, the dish was transferred from the incubator to the inverted fluorescence microscope (Eclipse Ts2R-FL, Nikon). The microscope was equipped with a motorized XY stage (ProScan H117P1N4, Prior Scientific) and a CMOS camera (DigiRetina 16. Tucsen Photonics). A homemade control software [28], [29] first drove the motorized stage to move the dish (and the cultured cells) to predefined locations to capture DIC images and then drove the stage again to move the dish to the same locations to capture fluorescence images. 520 pairs of DIC and fluorescence images were captured under a 40× objective lens (CFI S Plan Fluor ELWD 40XC 228 MRH08430, Nikon). All images were RGB color images and resized to 1152 pixels× 863 pixels, representing approximately 216.500 μm×162.375 μm in the dish.

Subplots of FIG. 6 are explained as follows. Subplot (a-1) is a DIC image of sparsely distributed adherent cells. Subplot (b-1) is a DIC image of densely distributed adherent cells. Subplot (c-1) is a DIC image of unhealthy adherent cells. Subplot (a-2) is a fluorescence image of stained cells in Subplot (a-1). Subplot (b-2) is a fluorescence image of stained cells in Subplot (b-1). Subplot (c-2) is a fluorescence image of stained cells in Subplot (c-1). Subplot (a-3) is a merged image of Subplots (a-1) and (a-2). Subplot (b-3) is a merged image of Subplots (b-1) and (b-2). Subplot (c-3) is a merged image of Subplots (c-1) and (c-2). Subplot (a-4) shows annotated cell classes of Subplot (a-1). Subplot (b-4) shows annotated cell classes of Subplot (b-1). Subplot (c-4) shows annotated cell classes of Subplot (c-1). Subplot (a-5) shows annotated ground truth of Subplot (a-1). Subplot (b-5) shows annotated ground truth of Subplot (b-1). Subplot (c-5) shows annotated ground truth of Subplot (c-1).

The dataset is randomly partitioned into three parts: 312 images for training, 104 for validation, and 104 for testing. It contains 12198 cells in total. We compared our DVSISN 100 against a plurality of state-of-the-art algorithms along with ablations on the dataset.

Twelve metrics that calculate the AP of bounding boxes and masks with different thresholds are used to report the performances of evaluated algorithms, as shown in Table 1. Most experiments were conducted on two NVIDIA 2080 Ti GPUs.

TABLE 1

Average Precision Metrics for Object Detection and Instance Segmentation.

| Metrics | Meaning |
|---|---|
| $AP^{bbox}$ | AP at IoU = 0.50:0.05:0.95 (primary challenge metric) for object detection, i.e., drawing bounding boxes of detected objects |
| $AP_{0.50}^{bbox}$ | AP at IoU = 0.50 (PASCAL VOC metric) for object detection |
| $AP_{0.75}^{bbox}$ | AP at IoU = 0.75 (strict metric) for object detection |
| $AP^{segm}$ | AP at IoU = 0.50:0.05:0.95 (primary challenge metric) for instance segmentation, i.e., generating individual masks of detected objects |
| $AP_{0.50}^{segm}$ | AP at IoU = 0.50 (PASCAL VOC metric) for instance segmentation |
| $AP_{0.75}^{segm}$ | AP at IoU = 0.75 (strict metric) for instance segmentation |
| $AR_1^{bbox}$ | AR given 1 detection per image |
| $AR_{10}^{bbox}$ | AR given 10 detection per image |
| $AP_{100}^{bbox}$ | AR given 100 detection per image |
| $AR_1^{segm}$ | AR given 1 detection per image |
| $AR_{10}^{segm}$ | AR given 10 detection per image |
| $AP_{100}^{segm}$ | AR given 100 detection per image |

The quantitative results of adherent cell instance segmentation are shown in Table 2. StarDist, ANCIS, Rotated Mask R-CNN, and four generic instance segmentation algorithms (Mask R-CNN, Mask Scoring R-CNN, PointRend, and QueryInst) from the MMDetection toolbox were selected to compare with our method. Among these algorithms, ANCIS only natively supports the detection and segmentation of a single category of cells in a single image. Detailed comparison results are provided in Table 2. DVSISN 100 achieves an APbbox 0.75 score of 0.424 and an APsegm 0.75 score of 0.481, demonstrating excellent performance in both bounding box detection and instance segmentation tasks for healthy cells. DVSISN 100 also achieves best AR scores for healthy cells, indicating that DVSISN 100 captures most positive cases, as proved in FIG. 7.

TABLE 2

Quantitative Results of Adherent Cell Instance Segmentation.

| Method | Backbone | Category | $AP^{bbox}$ | $AP_{0.50}^{bbox}$ | $AP_{0.75}^{bbox}$ | $AR_1^{bbox}$ | $AR_{10}^{bbox}$ | $AR_{100}^{bbox}$ |
|---|---|---|---|---|---|---|---|---|
| Mask R-CNN | R-50 | Healthy cells | 0.533 | 0.902 | 0.579 | 0.038 | 0.302 | 0.606 |
| | | Unhealthy cells | 0.171 | 0.425 | 0.106 | 0.090 | 0.298 | 0.337 |
| | | Average | 0.352 | 0.663 | 0.342 | 0.064 | 0.300 | 0.471 |
| | R-101 | Healthy cells | 0.496 | 0.890 | 0.501 | 0.037 | 0.286 | 0.579 |
| | | Unhealthy cells | 0.164 | 0.389 | 0.101 | 0.093 | 0.276 | 0.330 |
| | | Average | 0.33 | 0.640 | 0.301 | 0.065 | 0.281 | 0.455 |
| Mask Soring R-CNN | R-50 | Healthy cells | 0.51 | 0.893 | 0.537 | 0.036 | 0.292 | 0.598 |
| | | Unhealthy cells | 0.17 | 0.393 | 0.103 | 0.090 | 0.301 | 0.337 |
| | | Average | 0.34 | 0.643 | 0.320 | 0.063 | 0.297 | 0.467 |
| | R-101 | Healthy cells | 0.524 | 0.898 | 0.559 | 0.038 | 0.296 | 0.607 |
| | | Unhealthy cells | 0.176 | 0.391 | 0.123 | 0.092 | 0.301 | 0.331 |
| | | Average | 0.35 | 0.644 | 0.341 | 0.065 | 0.299 | 0.469 |
| PointRend | R-50 | Healthy cells | 0.517 | 0.909 | 0.543 | 0.038 | 0.293 | 0.599 |
| | | Unhealthy cells | 0.163 | 0.408 | 0.088 | 0.098 | 0.293 | 0.340 |
| | | Average | 0.34 | 0.659 | 0.315 | 0.068 | 0.293 | 0.470 |
| QueryInst | R-50 | Healthy cells | 0.273 | 0.549 | 0.238 | 0.026 | 0.181 | 0.566 |
| | | Unhealthy cells | 0.068 | 0.167 | 0.042 | 0.061 | 0.209 | 0.396 |
| | | Average | 0.171 | 0.358 | 0.140 | 0.044 | 0.195 | 0.481 |
| | R-101 | Healthy cells | 0.259 | 0.546 | 0.217 | 0.027 | 0.178 | 0.551 |
| | | Unhealthy cells | 0.063 | 0.158 | 0.037 | 0.063 | 0.198 | 0.375 |
| | | Average | 0.161 | 0.352 | 0.127 | 0.045 | 0.188 | 0.463 |
| Rotated Mask R-CNN | R-50 | Healthy cells | 0.337 | 0.841 | 0.168 | 0.026 | 0.212 | 0.483 |
| | | Unhealthy cells | 0.139 | 0.373 | 0.069 | 0.089 | 0.244 | 0.301 |
| | | Average | 0.238 | 0.607 | 0.118 | 0.058 | 0.228 | 0.392 |
| | R-101 | Healthy cells | 0.345 | 0.837 | 0.187 | 0.026 | 0.216 | 0.490 |
| | | Unhealthy cells | 0.026 | 0.216 | 0.490 | 0.077 | 0.241 | 0.295 |
| | | Average | 0.238 | 0.602 | 0.122 | 0.052 | 0.229 | 0.392 |
| StarDist | U-Net | Healthy cells | 0.360 | 0.669 | 0.346 | 0.032 | 0.265 | 0.426 |
| | | Unhealthy cells | 0.140 | 0.348 | 0.070 | 0.089 | 0.233 | 0.235 |
| | | Average | 0.250 | 0.509 | 0.208 | 0.061 | 0.249 | 0.330 |
| ANCIS | R-50 | Healthy cells | 0.387 | 0.690 | 0.403 | 0.033 | 0.282 | 0.454 |
| | | Unhealthy cells | 0.167 | 0.351 | 0.131 | 0.089 | 0.290 | 0.296 |
| | | Average | 0.277 | 0.521 | 0.267 | 0.061 | 0.286 | 0.375 |
| | R-101 | Healthy cells | 0.15 | 0.493 | 0.047 | 0.016 | 0.129 | 0.280 |
| | | Unhealthy cells | 0.059 | 0.172 | 0.031 | 0.045 | 0.113 | 0.113 |
| | | Average | 0.104 | 0.332 | 0.039 | 0.030 | 0.121 | 0.197 |
| DVSISN | R-50 | Healthy cells | 0.546 | 0.885 | 0.611 | 0.037 | 0.310 | 0.618 |
| | | Unhealthy cells | 0.223 | 0.441 | 0.237 | 0.103 | 0.290 | 0.294 |
| | | Average | 0.384 | 0.663 | 0.424 | 0.070 | 0.300 | 0.456 |
| | R-101 | Healthy cells | 0.535 | 0.883 | 0.599 | 0.037 | 0.307 | 0.609 |
| | | Unhealthy cells | 0.228 | 0.446 | 0.207 | 0.109 | 0.306 | 0.311 |
| | | Average | 0.382 | 0.664 | 0.403 | 0.073 | 0.306 | 0.460 |

TABLE 2-continued

Quantitative Results of Adherent Cell Instance Segmentation.

| Method | Backbone | Category | $AP^{segm}$ | $AP_{0.50}^{segm}$ | $AP_{0.75}^{segm}$ | $AR_1^{segm}$ | $AR_{10}^{segm}$ | $AR_{100}^{segm}$ |
|---|---|---|---|---|---|---|---|---|
| Mask R-CNN | R-50 | Healthy cells | 0.504 | 0.885 | 0.561 | 0.036 | 0.287 | 0.573 |
| | | Unhealthy cells | 0.178 | 0.403 | 0.136 | 0.095 | 0.307 | 0.343 |
| | | Average | 0.341 | 0.644 | 0.348 | 0.066 | 0.297 | 0.458 |
| | R-101 | Healthy cells | 0.407 | 0.815 | 0.374 | 0.032 | 0.255 | 0.490 |
| | | Unhealthy cells | 0.158 | 0.405 | 0.096 | 0.084 | 0.256 | 0.293 |
| | | Average | 0.283 | 0.610 | 0.235 | 0.058 | 0.255 | 0.391 |
| Mask Soring R-CNN | R-50 | Healthy cells | 0.386 | 0.777 | 0.277 | 0.017 | 0.125 | 0.419 |
| | | Unhealthy cells | 0.200 | 0.333 | 0.333 | 0.000 | 0.600 | 0.600 |
| | | Average | 0.293 | 0.555 | 0.305 | 0.009 | 0.362 | 0.510 |
| | R-101 | Healthy cells | 0.397 | 0.811 | 0.331 | 0.012 | 0.117 | 0.452 |
| | | Unhealthy cells | 0.120 | 0.200 | 0.200 | 0.000 | 0.600 | 0.600 |
| | | Average | 0.258 | 0.505 | 0.265 | 0.006 | 0.359 | 0.526 |
| PointRend | R-50 | Healthy cells | 0.390 | 0.896 | 0.268 | 0.006 | 0.106 | 0.460 |
| | | Unhealthy cells | 0.300 | 0.500 | 0.500 | 0.000 | 0.600 | 0.600 |
| | | Average | 0.345 | 0.698 | 0.384 | 0.003 | 0.353 | 0.530 |
| QueryInst | R-50 | Healthy cells | 0.179 | 0.429 | 0.103 | 0.006 | 0.038 | 0.371 |
| | | Unhealthy cells | 0.167 | 0.333 | 0.000 | 0.000 | 0.500 | 0.500 |
| | | Average | 0.173 | 0.381 | 0.052 | 0.003 | 0.269 | 0.436 |
| | R-101 | Healthy cells | 0.159 | 0.404 | 0.079 | 0.017 | 0.048 | 0.335 |
| | | Unhealthy cells | 0.300 | 0.500 | 0.500 | 0.000 | 0.600 | 0.600 |
| | | Average | 0.230 | 0.452 | 0.289 | 0.009 | 0.324 | 0.467 |
| Rotated Mask R-CNN | R-50 | Healthy cells | 0.417 | 0.816 | 0.388 | 0.033 | 0.255 | 0.513 |
| | | Unhealthy cells | 0.172 | 0.416 | 0.096 | 0.098 | 0.257 | 0.314 |
| | | Average | 0.295 | 0.616 | 0.242 | 0.066 | 0.256 | 0.414 |
| | R-101 | Healthy cells | 0.429 | 0.828 | 0.404 | 0.032 | 0.257 | 0.539 |
| | | Unhealthy cells | 0.157 | 0.406 | 0.082 | 0.085 | 0.240 | 0.297 |
| | | Average | 0.293 | 0.617 | 0.243 | 0.059 | 0.248 | 0.418 |
| StarDist | U-Net | Healthy cells | 0.206 | 0.488 | 0.136 | 0.017 | 0.187 | 0.316 |
| | | Unhealthy cells | 0.114 | 0.292 | 0.060 | 0.074 | 0.201 | 0.204 |
| | | Average | 0.160 | 0.390 | 0.098 | 0.045 | 0.194 | 0.260 |
| ANCIS | R-50 | Healthy cells | 0.218 | 0.501 | 0.150 | 0.018 | 0.188 | 0.330 |
| | | Unhealthy cells | 0.133 | 0.330 | 0.079 | 0.074 | 0.243 | 0.249 |
| | | Average | 0.176 | 0.415 | 0.114 | 0.046 | 0.216 | 0.289 |
| | R-101 | Healthy cells | 0.334 | 0.796 | 0.170 | 0.026 | 0.208 | 0.421 |
| | | Unhealthy cells | 0.078 | 0.207 | 0.044 | 0.052 | 0.124 | 0.125 |
| | | Average | 0.206 | 0.501 | 0.107 | 0.039 | 0.166 | 0.273 |
| DVSISN | R-50 | Healthy cells | 0.591 | 0.897 | 0.733 | 0.037 | 0.318 | 0.643 |
| | | Unhealthy cells | 0.219 | 0.431 | 0.228 | 0.101 | 0.280 | 0.284 |
| | | Average | 0.405 | 0.664 | 0.481 | 0.069 | 0.299 | 0.464 |
| | R-101 | Healthy cells | 0.582 | 0.896 | 0.720 | 0.037 | 0.315 | 0.634 |
| | | Unhealthy cells | 0.225 | 0.443 | 0.220 | 0.103 | 0.297 | 0.303 |
| | | Average | 0.403 | 0.670 | 0.470 | 0.070 | 0.306 | 0.468 |

Figure 7:
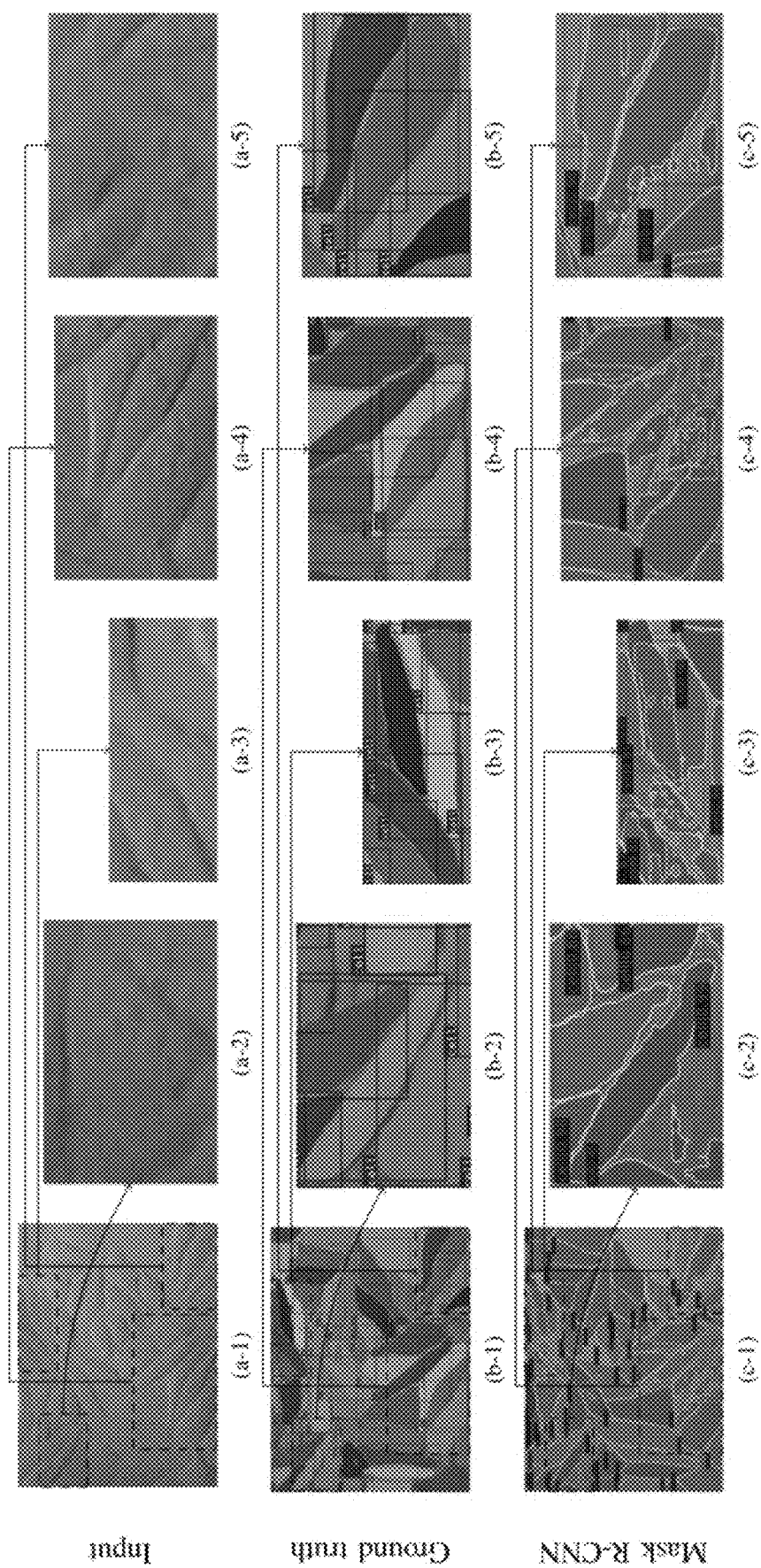
FIG. 7 is a demonstration of qualitative segmentation results of adherent cell images as obtained by the DVSISN.
Figure 7:
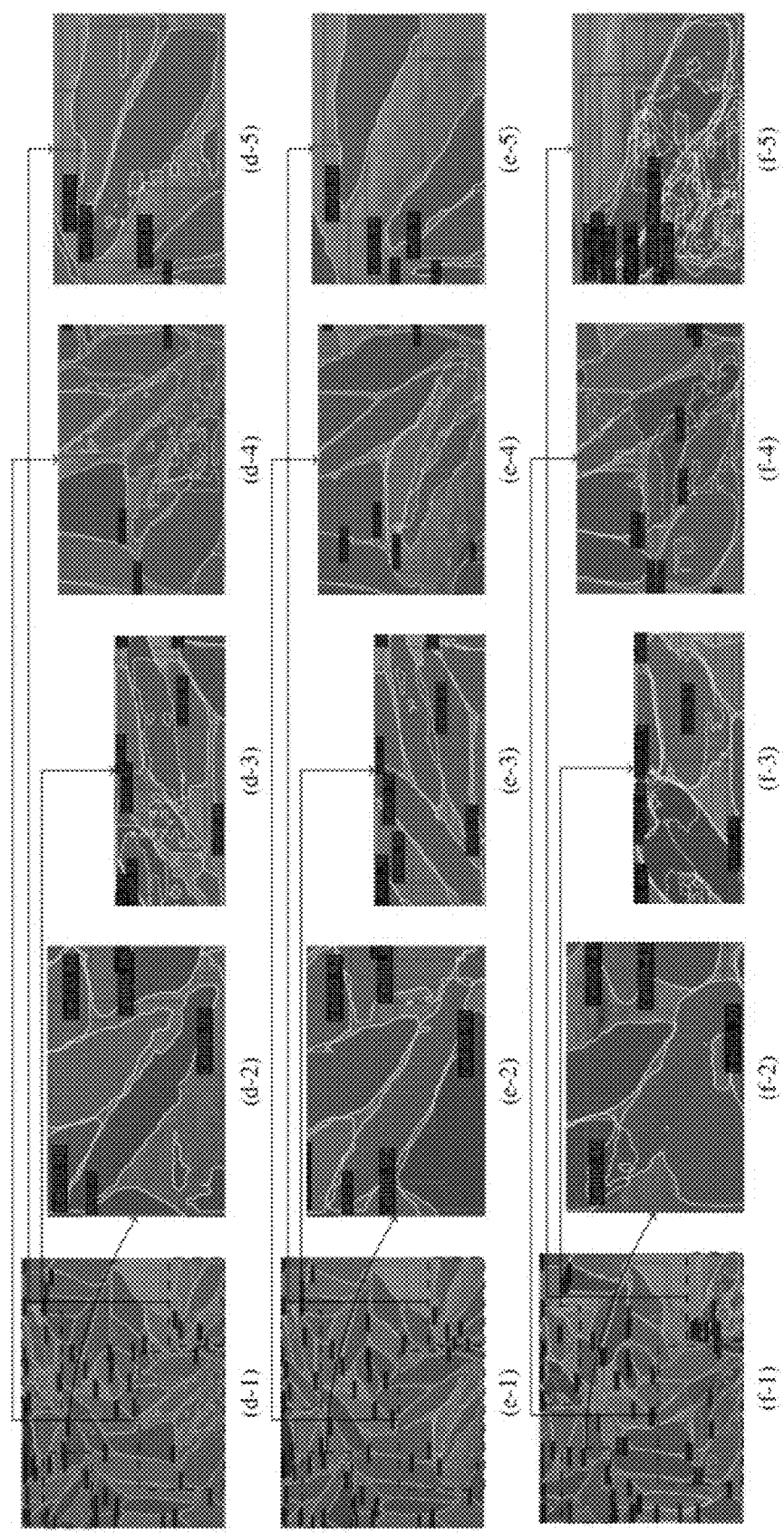
Figure 7:
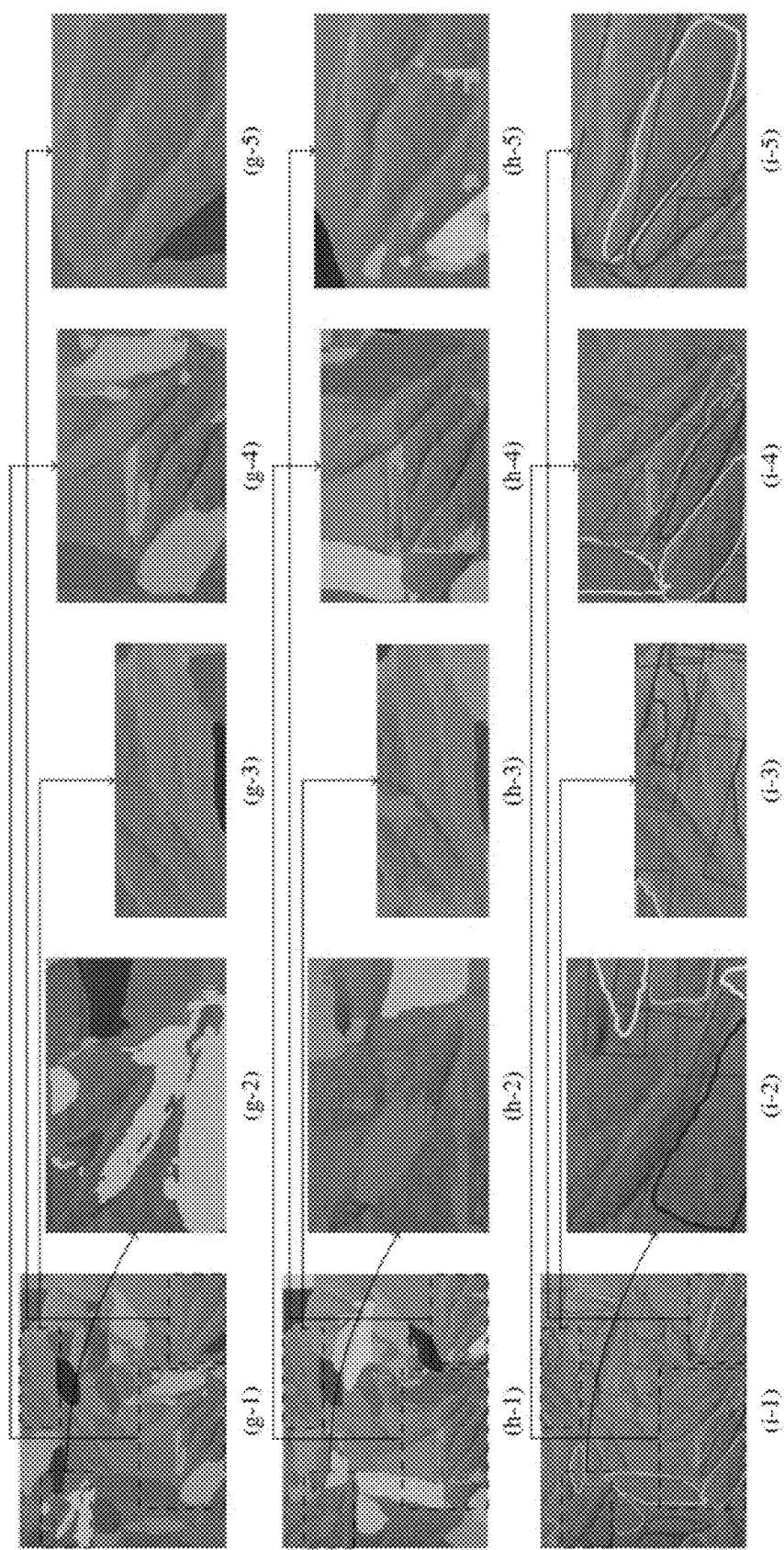
Figure 7:
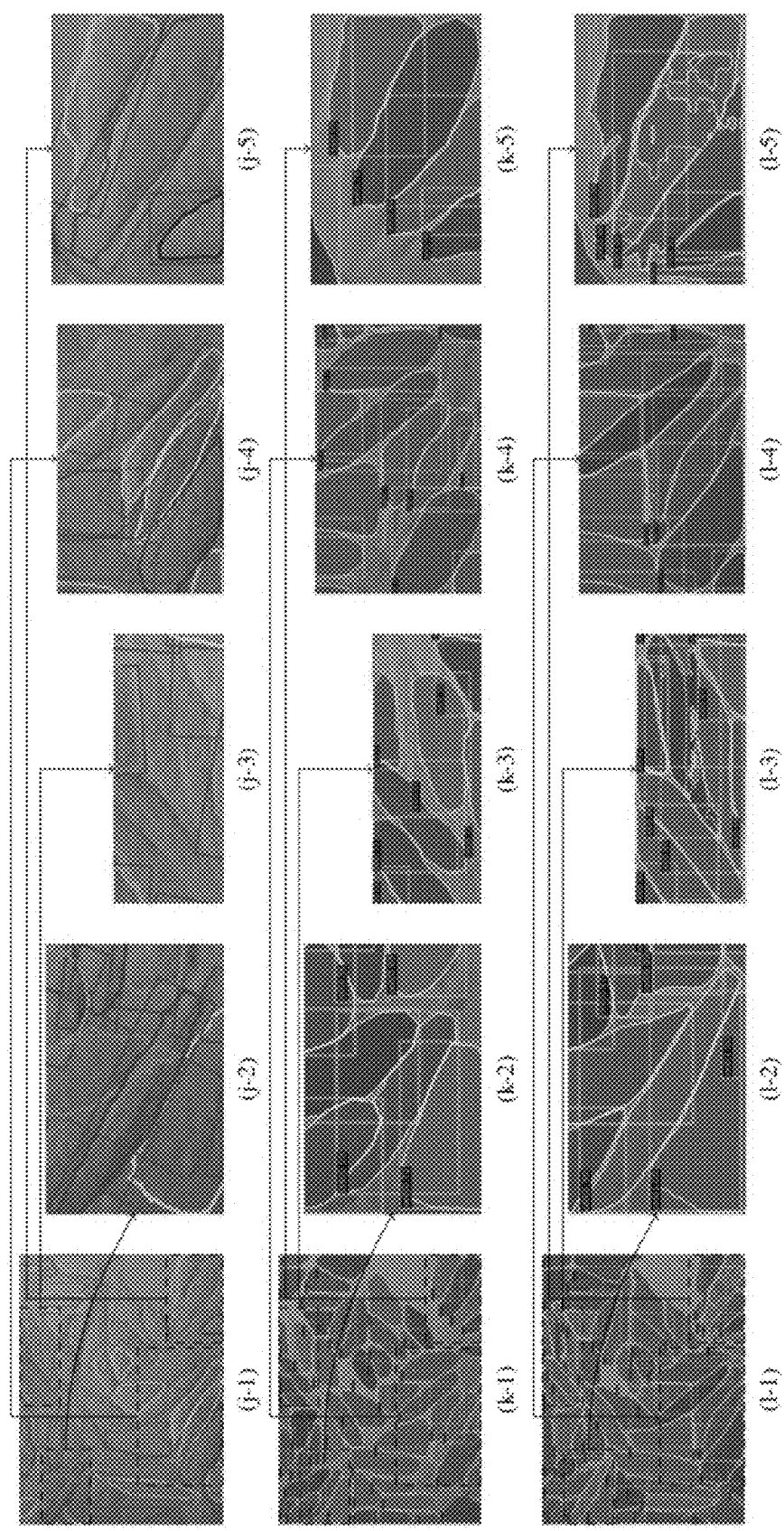
Figure 7:
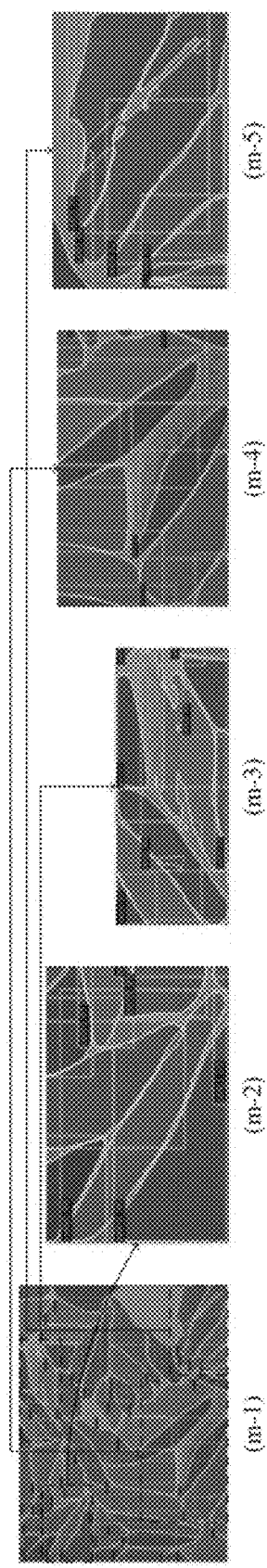

FIG. 7 is a demonstration of qualitative segmentation results of adherent cell images as obtained by the DVSISN 100. For each segmented image [Subplots (c-1) to (m-1) in FIG. 7], four close-ups are cropped and rendered on the right, as shown in Subplots (c-2) to (m-5) in FIG. 7. At first glance, Mask R-CNN, Mask Scoring R-CNN, PointRend, and QueryInst can apparently identify individual cells relatively well, as echoed by their numerical results in Table 2. However, their segmentation details are unsatisfactory. A typical problem is that a few titled cells are always neglected, particularly when cells are densely distributed. Additionally, it appears that StarDist, ANCIS, and Rotated Mask R-CNN exhibit less satisfactory performance in comparison. This could be attributed to several reasons: StarDist uses U-Net as its backbone, which performs well in semantic segmentation but may lack in object detection and instance segmentation tasks. ANCIS incorporates attention mechanisms in both object detection and post-detection segmentation stages, but its object detection results are somewhat inadequate, leading to less accurate segmentation. Similarly, Rotated Mask R-CNN adopts rotated bounding boxes for detection, but its experimental outcomes still fall short of our method's performance. Overall, our method demonstrates remarkable improvement. It can accurately detect and segment cells in sparsely and densely distributed situations, as demonstrated in Subplots (m-2) to (m-5) in FIG. 7.

The present disclosure may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

REFERENCES

There follows a list of references that are occasionally cited in the specification. Each of the disclosures of these references is incorporated by reference herein in its entirety.

[1] B. Alberts et al., *Essential Cell Biology*, 4th ed. New York, NY: Garland Science, 2013.

[2] G. Karp, J. Iwasa, and W. Marshall, *Karp's Cell and Molecular Biology: Concepts and Experiments*, 8th ed. Wiley, 2015.

[3] T. Vicar et al., "Cell segmentation methods for label-free contrast microscopy: Review and comprehensive comparison," *BMC Bioinformatics*, vol. 20, p. 360, June 2019, doi: 10/ggtqhb.

[4] J. C. Vizcarra et al., "A community-based approach to image analysis of cells, tissues and tumors," *Computerized Medical Imaging and Graphics*, vol. 95, p. 102013, January 2022, doi: 10/gq2wfn.

[5] E. Moen, D. Bannon, T. Kudo, W. Graf, M. Covert, and D. V. Valen, "Deep learning for cellular image analysis," *Nature Methods*, vol. 16, no. 12, pp. 1233-1246 December 2019, doi: 10/gf26n8.

[6] E. Meijering, "Cell segmentation: 50 years down the road," *IEEE Signal Processing Magazine*, vol. 29, no. 5, pp. 140-145, August 2012, doi: 10/gfghgs.

[7] S. Minaee, Y. Y. Boykov, F. Porikli, A. J. Plaza, N. Kehtarnavaz, and D. Terzopoulos, "Image segmentation using deep learning: A survey," *IEEE Transactions on Pattern Analysis and Machine Intelligence*, vol. 44, no. 7, pp. 3523-3542 February 2021, doi: 10/gjh26c.

[8] K. He, G. Gkioxari, P. Dollár, and R. Girshick, "Mask R-CNN," in *Proceedings of the IEEE International Conference on Computer Vision (ICCV)*, Venice, Italy, October 2017, pp. 2980-2988. doi: 10/gfghjd.

[9] S. Ren, K. He, R. Girshick, and J. Sun, "Faster R-CNN: Towards real-time object detection with region proposal networks," in *Advances in Neural Information Processing Systems*, Montréal, Québec, Canada: Curran Associates, Inc., December 2015, pp. 91-99.

[10] Z. Huang, L. Huang, Y. Gong, C. Huang, and X. Wang, "Mask scoring R-CNN," in *Proceedings of the IEEE/CVF Conference on Computer Vision and Pattern Recognition (CVPR)*, June 2019, pp. 6409-6418. doi: 10/gg3d6j.

[11] S. Looi, "Rotated mask R-CNN: From bounding boxes to rotated bounding boxes." GitHub, 2019. [Online]. Available: https://github.com/mrlooi/rotated_maskrenn

[12] A. Kirillov, Y. Wu, K. He, and R. Girshick, "PointRend: Image segmentation as rendering," in *Proceedings of the IEEE/CVF Conference on Computer Vision and Pattern Recognition (CVPR)*, June 2020, pp. 9799-9808. doi: 10/ghbb7m.

[13] Y. Fang et al., "Instances as queries," in *Proceedings of the IEEE/CVF International Conference on Computer Vision (ICCV)*, October 2021, pp. 6910-6919. doi: 10/gqggpx.

[14] N. Carion, F. Massa, G. Synnaeve, N. Usunier, A. Kirillov, and S. Zagoruyko, "End-to-end object detection with transformers," in *Proceedings of the European Conference on Computer Vision (ECCV)*, A. Vedaldi, H. Bischof, T. Brox, and J.-M. Frahm, Eds., in Lecture Notes in Computer Science. Cham: Springer International Publishing. August 2020, pp. 213-229. doi: 10/ghw3xx.

[15] L. Maddalena, L. Antonelli, A. Albu, A. Hada, and M. R. Guarracino, "Artificial intelligence for cell segmentation, event detection, and tracking for label-free microscopy imaging," *Algorithms*, vol. 15, no. 9, Art. no. 9, September 2022, doi: 10/grnd94.

[16] U. Schmidt, M. Weigert, C. Broaddus, and G. Myers, "Cell detection with star-convex polygons," in *Medical Image Computing and Computer Assisted Intervention—MICCAI 2018*, A. F. Frangi, J. A. Schnabel, C. Davatzikos, C. Alberola-López, and G. Fichtinger, Eds., in Lecture Notes in Computer Science. Cham: Springer International Publishing. 2018, pp. 265-273. doi: 10/gg-nzqb.

[17] J. C. Caicedo et al., "Nucleus segmentation across imaging experiments: The 2018 Data Science Bowl," *Nat Methods*, vol. 16, no. 12, Art. no. 12, December 2019, doi: 10/ggcd7h.

[18] J. Yi, P. Wu, M. Jiang, Q. Huang, D. J. Hoeppner, and D. N. Metaxas, "Attentive neural cell instance segmentation," *Medical Image Analysis*, vol. 55, pp. 228-240, July 2019, doi: 10/gg73zt.

[19] W. Liu et al., "SSD: Single shot multibox detector," in *Proceedings of the European Conference on Computer Vision (ECCV)*, B. Leibe, J. Matas, N. Sebe, and M. Welling, Eds., in Lecture Notes in Computer Science. Amsterdam, The Netherlands: Springer International Publishing. September 2016, pp. 21-37. doi: 10/gc7rk8.

[20] O. Ronneberger, P. Fischer, and T. Brox, "U-Net: Convolutional networks for biomedical image segmentation," in *Medical Image Computing and Computer-Assisted Intervention—MICCAI 2015*, N. Navab, J. Hornegger, W. M. Wells, and A. F. Frangi, Eds., in Lecture Notes in Computer Science, vol. 9351. Munich, Germany: Springer International Publishing, October 2015, pp. 234-241. doi: 10/gcgk7j.

[21] T. Prangemeier, C. Reich, and H. Koeppl, "Attention-based transformers for instance segmentation of cells in microstructures," in 2020 *IEEE International Conference on Bioinformatics and Biomedicine (BIBM)*, December 2020, pp. 700-707. doi: 10/gkcqx7.

[22] K. He, X. Zhang, S. Ren, and J. Sun, "Deep residual learning for image recognition," in *Proceedings of the IEEE Conference on Computer Vision and Pattern Recognition(CVPR)*, Las Vegas, Nevada, USA, June 2016, pp. 770-778. doi: 10/gdcfkn.

[23] A. Neubeck and L. Van Gool, "Efficient non-maximum suppression," in 18*th International Conference on Pattern Recognition (ICPR'06)*, August 2006, pp. 850-855. doi: 10/ctkpss.

[24] K. Chen et al., "MMDetection: Open MMLab detection toolbox and benchmark." arXiv, Jun. 17, 2019. doi: 10.48550/arXiv.1906.07155.

[25] A. Paszke et al., "PyTorch: An imperative style, high-performance deep learning library," in *Advances in Neural Information Processing Systems*, Curran Associates, Inc., 2019.

[26] T.-Y. Lin et al., "Microsoft COCO: Common objects in context," in *Proceedings of the European Conference on Computer Vision (ECCV)*, D. Fleet, T. Pajdla, B. Schiele, and T. Tuytelaars, Eds., in Lecture Notes in Computer Science. Zurich, Switzerland: Springer International Publishing, September 2014, pp. 740-755. doi: 10/gfvksh.

[27] J. Deng, W. Dong, R. Socher, L.-J. Li, K. Li, and F.-F. Li, "ImageNet: A large-scale hierarchical image database," in *Proceedings of the IEEE/CVF Conference on Computer Vision and Pattern Recognition (CVPR)*, Miami, Florida, USA, June 2009, pp. 248-255. doi: 10/cvc7xp.

[28] F. Pan, S. Chen, Y. Jiao, Z. Guan, A. Shakoor, and D. Sun, "Automated high-productivity microinjection system for adherent cells," *IEEE Robotics and Automation Letters*, vol. 5, no. 2, pp. 1167-1174 January 2020, doi: 10/gg73zn.

[29] F. Pan, Y. Jiao, S. Chen, L. Xing, and D. Sun, "Deep learning-enhanced dual-module large-throughput microinjection system for adherent cells," *IEEE Transactions on Automation Science and Engineering*, pp. 1-14, 2022, doi: 10/gq5fhz.

What is claimed is:

1. A computer-implemented method of cell instance segmentation of an original cell image obtained by microscopy, the method comprising:
    rotating the original cell image by a rotation angle to yield a rotated cell image;
    using a first machine-learning model configured for cell instance segmentation to process the original and rotated cell images such that effectively, horizontal boxes and oblique boxes are used in bounding cells of the original cell image for enhancing cell-segmentation accuracy in segmenting the original cell image, wherein the first machine-learning model generates a set of predictions for an individual cell instance in a plurality of cell instances identified from the original and rotated cell images such that a first plurality of sets of predictions is obtained for the plurality of cell instances, and wherein the set of predictions includes a bounding box for bounding the individual cell instance, and a foreground-background binary mask for predicting a space occupied by the individual cell instance;
    removing, from the first plurality of sets of predictions, any set of predictions having the predicted space not simply connected to thereby form a second plurality of sets of predictions;
    using a second machine-learning model to classify an individual set of predictions in the second plurality of sets of predictions as a wanted set of predictions or an unwanted set of predictions according to a prediction performance of the individual set of predictions;
    removing, from the second plurality of sets of predictions, any unwanted set of predictions to form a third plurality of sets of predictions;
    removing, from the third plurality of sets of predictions, any redundant set of predictions to form a fourth plurality of sets of predictions, wherein an individual redundant set of predictions as generated for a cell instance located or equivalently located at a location on the original cell image has another set of predictions generated for the same location in the third plurality of sets of predictions; and
    using the fourth plurality of sets of predictions to produce a segmentation map for the original cell image.

2. The method of claim 1, wherein the rotation angle is 45°.

3. The method of claim 1, wherein the set of predictions further includes one or more class labels for classifying the individual cell instance.

4. The method of claim 3, wherein the first machine-learning model for processing an input image comprises:
    a backbone for extracting features of the input image to generate feature maps;
    a region proposal network (RPN) for generating region proposals from the feature maps;
    a RoIAlign module for aligning the input image and the feature maps;
    a plurality of fully-connected (FC) layers for bounding-box generation and class-label generation from the feature maps; and
    a plurality of convolution layers for foreground-background binary mask generated from the feature maps.

5. The method of claim 4, wherein the backbone is implemented as ResNet-50 or ResNet-101.

6. The method of claim 1, wherein the second machine-learning model is a ResNet classifier.

7. The method of claim 1, wherein the cells of the original cell image are adherent cells.

8. The method of claim 1, wherein the cells of the original cell image are unstained.

9. The method of claim 1, wherein the cells of the original cell image are living cells.

10. The method of claim 1, wherein the original cell image is a differential interference contrast (DIC) image.

11. A non-transitory computer readable storage medium stored with program instructions which, when executed by a computing processor, cause the computing processor to execute a process of segmenting cells in original cell images according to the method of claim 1.

12. A computer-implemented method for segmenting cells in plural original cell images obtained by microscopy, the method comprising the steps of:
    (a) rotating the original cell images to obtain rotated cell images;
    (b) training a deep-learning-based instance segmentation algorithm on a cell image dataset comprising the original cell images and rotated cell images;
    (c) using the trained deep-learning-based instance segmentation algorithm to process the original cell images and rotated cell images to obtain predictions, wherein the predictions include predicted bounding boxes, classification labels, and foreground-background binary masks;

(d) concatenating the predictions for every pair of an individual original cell image and a corresponding rotated cell image throughout the entire dataset;

(e) filtering the concatenated predictions as identified in the step (d);

(f) saving the filtered predictions offline;

(g) compacting the saved offline predictions by removing respective saved offline predictions having corresponding foreground-background binary masks not simply connected;

(h) formulating masked images for the saved offline predictions identified in the step (g), wherein an individual masked image is obtained by overlaying a background part of corresponding predicted binary mask on a corresponding original image;

(i) training a deep-learning-based binary classification algorithm with the masked images obtained in the step (h) to generate unwanted and wanted masks; and (j) processing the wanted masks obtained in the step (i) to produce final segmentation.

13. The method of claim 12, wherein the cells are adherent cells.

14. The method of claim 12, wherein the cells are unstained.

15. The method of claim 12, wherein the cells are living cells.

16. The method of claim 12, wherein the original cell images are differential interference contrast (DIC) images.

17. A non-transitory computer readable storage medium stored with program instructions which, when executed by a computing processor, cause the computing processor to execute a process of segmenting cells in original cell images according to the method of claim 12.

* * * * *